United States Patent [19]

Trigg et al.

[11] Patent Number: 5,159,669

[45] Date of Patent: Oct. 27, 1992

[54] AUTOMATICALLY CREATING A SECOND WORKSPACE OPERATION RECORD INCLUDING HISTORY DATA AND A UNIT ID BASED ON A FIRST WORKSPACE OPERATION

[75] Inventors: Randall H. Trigg, Mountain View; Peggy M. Irish, San Carlos; Lucy A. Suchman, San Francisco, all of Calif.

[73] Assignee: Xerox Corporation, Stamford, Conn.

[21] Appl. No.: 285,183

[22] Filed: Dec. 15, 1988

[51] Int. Cl.⁵ .................... G06F 3/14; G06F 15/62
[52] U.S. Cl. .................... 395/159; 395/118; 395/133; 395/157; 395/775; 364/DIG. 1; 364/226.1; 364/237.5; 364/927.7; 364/943.5; 371/19
[58] Field of Search ... 364/200 MS File, 900 MS File, 364/521; 395/575, 775, 600, 100, 159; 371/19

[56] References Cited

U.S. PATENT DOCUMENTS

| | | | |
|---|---|---|---|
| 4,189,781 | 2/1980 | Douglas | 395/425 |
| 4,322,813 | 3/1982 | Howard et al. | 364/178 |
| 4,658,351 | 4/1987 | Teng | 395/650 |
| 4,751,702 | 6/1988 | Beier et al. | 371/9.1 |
| 4,807,154 | 2/1989 | Scully et al. | 364/518 |
| 4,807,155 | 2/1989 | Cree et al. | 364/518 |
| 4,813,013 | 3/1989 | Dunn | 395/159 |
| 4,819,191 | 4/1989 | Scully et al. | 364/518 |
| 4,868,744 | 9/1989 | Reinsch et al. | 364/280.3 |
| 4,878,167 | 10/1989 | Kapulka et al. | 395/575 |
| 4,885,704 | 12/1989 | Takagi et al. | 364/521 |
| 4,893,270 | 1/1990 | Beck et al. | 364/400 |
| 4,914,586 | 4/1990 | Swinehart et al. | 395/600 |
| 4,939,507 | 7/1990 | Beard et al. | 340/706 |
| 4,945,474 | 7/1990 | Elliott et al. | 395/575 |
| 4,974,173 | 11/1990 | Stefik et al. | 364/521 |
| 4,982,344 | 1/1991 | Jordan | 364/521 |
| 5,043,866 | 8/1991 | Myre, Jr. et al. | 396/600 |
| 5,047,918 | 9/1991 | Schwartz et al. | 395/600 |
| 5,072,412 | 12/1991 | Henderson, jr. et al. | 395/159 |
| 5,107,443 | 4/1992 | Smith et al. | 395/158 |
| 5,121,478 | 6/1992 | Rao | 395/157 |

FOREIGN PATENT DOCUMENTS

| | | |
|---|---|---|
| 0270360 | 6/1988 | European Pat. Off. |
| 339901A | 2/1989 | European Pat. Off. |
| 0371608 | 6/1990 | European Pat. Off. |

OTHER PUBLICATIONS

Trigg, R. H., Suchman, L. A., and Halasz, F. G., "Supporting Callaboration in NoteCards", *Proceedings of the Conference on Computer-Supported Cooperative Work*, Austin, Tex., Dec. 3–5, 1986, pp. 153–162.

(List continued on next page.)

*Primary Examiner*—Thomas C. Lee
*Assistant Examiner*—Krisna Lim

[57] ABSTRACT

A data processing system creates a log of operations performed on data units within a data structure, such as on objects corresponding to cards and links in a hypermedia database. The log includes items, each with data indicating an operation and indicating the unique identifier (UID) of each object affected by the operation. In response to a user request, the system scans through the log and includes appropriate data in the object corresponding to a special card called the history card. The data included in the history card's object for an item in the log can include a description of the operation indicated in that item and data for providing access to an affected card through an icon that is presented in the history card. Data indicating the affected card's UID is also associated with the history card's object, either by being included in the object or by being included in a linking data unit or object associated with the history card's object and with the affected card's object. The icon can be a pointer icon that provides one-way access in which case the user can subsequently request that the pointer icon be converted to a link icon that provides two-way access; in response to such a request, the system creates a linking object accessible both from the history card's object and from the affected card's object. The system also provides a user interface through which the user can select the types of events for which data is included in the history card's object.

7 Claims, 5 Drawing Sheets

OTHER PUBLICATIONS

Halasz, F. G., "Reflections on NoteCards: Seven Issues for the Next Generation of Hypermedia Systems", *Hypertext '87 Papers*, Chapel Hill, N.C., Nov. 13–15, 1987, pp. 345–365.

Jensen, A-M. S., Jordan, D. S., and Russell, D. M., "The IDE System for Creating Instruction", presented to Applications of Artificial Intelligence and CD-ROM in Education and Training Conference, Arlington, Va. Oct. 1987.

Goodman, D., "The Complete HyperCard Handbook", Bantam Books, New York, 1987, pp. 32–34, 65–67 and 185–192.

Garrett, L. N., Smith, K. E., and Meyrowitz, N., "Intermedia: Issues, Strategies, and Tactics in the Design of a Hypermedia Document System", *Proceedings of the Conference on Computer-Supported Cooperative Work*, Austin, Tex., Dec. 3–5, 1986, pp. 163–174.

Lewis, B. T. and Hodges, J. D., "Shared Books: Collaborative Publication Management for an Office Information System", *ACM Conference on Office Information Systems*, Mar. 23–25, 1988, ppp. 197–204.

Kasperski, R., Chang, E., and Mellon, L., "Cantata: Group Protocols in a Conferencing Environment", *IEEE International Conference on Systems, Man, and Cybernetics*, vol. 2, 1986, pp. 1343–1346.

Stefik, M., Bobrow, D. G., Foster, G., Lanning, S., and Tatar, D., "WYSIWIS Revised: Early Experiences with Multiuser Interfaces", *ACM Transactions on Office Information Systems*, vol. 5, No. 2, Apr. 1987, pp. 147–167.

Leblang, D. B., and Chase, R. P., Jr., "Computer-Aided Software Engineering in a Distributed Workstation Environment", in Henderson, P., (Ed.), *ACM SIGSOFT/SIGPLAN Software Eng. Symp. on Practical Software Development Environments*, Pittsburgh, Pa., Apr. 23–24, 1984.

LeLand, M. D. P., Fish, R. S., and Kraut, R. E., "Collaborative Document Production Using Quilt", *Computer Support of Cooperative Work (CSCW '88) Proceedings*, Sep. 1988, Portland, Ore., pp. 206–215.

Fish, R. S., Kraut, R. E., Leland, M. D. P., and Cohen, M., "Quilt: A Collaborative Tool for Cooperative Writing", *Conference on Information Systems (COIS '88) Proceedings*, May 1988, Palo Alto, Calif., pp. 30–37.

Trigg, R. H., "Guided Tours and Tabletops: Tools for Communicating in a Hypertext Environment", *Computer Support of Cooperative Work (CSCS '88) Proceedings*, Sep. 1988, Portland, Ore.

Halasz, F. G., "Reflections on NoteCards: Seven Issues for the Next Generation of Hypermedia Systems", Communications of the ACM, vol. 31, No. 7, Jul. 1988, pp. 836–852.

Halasz, F. G., Moran, T., and Trigg, R. H., "NoteCards in a Nutshell", *CHI+GI '87 Conference*, Toronto, Canada, Apr. 5–9, 1987.

Xerox, Palo Alto Research Center, "Dribble Files", *Alto User's Handbook*, Sep. 1979, pp. 39, 54–55; Bravo Version 7.2 Summary.

Xerox Corporation, Interlisp Reference Manual, Oct. 1983, p. 6.12.

AUTOMATICALLY CREATING A SECOND WORKSPACE OPERATION RECORD INCLUDING HISTORY DATA AND A UNIT ID BASED ON A FIRST WORKSPACE OPERATION

This invention was made with Government support. The Government has certain rights in this invention.

BACKGROUND OF THE INVENTION

The present invention relates to techniques for preparing a record of operations performed by a data processing system. More specifically, the invention relates to the preparation of a record through which a user can obtain access to data affected by the operations described in the record.

Trigg, R. H., Suchman, L. A., and Halasz, F. G., "Supporting Collaboration in NoteCards," *Proceedings of the Conference on Computer-Supported Cooperative Work*, Austin, Tex. Dec. 3-5, 1986, pp. 153-162, describe NoteCards, a hypertext-based idea structuring system in which the basic object is an electronic notecard. (Underlying features of NoteCards are described in greater detail in Halasz, F. G., Moran, T., and Trigg, R. H., "NoteCards in a Nutshell," *CHI+GI'87 Conference*, Toronto, Canada, Apr. 5-9, 1987, incorporated herein by reference.) Page 153 states that annotative and procedural activities are necessary to maintain mutual intelligibility between collaborators. Pages 156-158 describe collaboration through draft passing, in which History cards keep records of each entry into a notefile of notecards and of the changes made during a collaborative session. A History card is created for each session, titled with the date and initialed by each participating collaborator. As shown and described in relation to FIG. 1, the card's text contains brief descriptions of the work done in that session and links to the cards that were created or modified. All history cards are filed in a history filebox and are kept in chronological order, allowing one collaborator to review the work done by another and follow links to the affected cards.

Halasz, F. G., "Reflections on NoteCards: Seven Issues for the Next Generation of Hypermedia Systems," *Hypertext '87 Papers*, Chapel Hill, N.C., Nov. 13-15, 1987, pp. 345-365, describes the NoteCards system as well as a number of design issues for future hypermedia systems. Pages 361-362 discuss the issue of versioning, and mentions several types of histories, including linear version threads or other version graphs for individual nodes and links or for a set of nodes, a version history for all entities in a hypermedia network, and a layer mechanism collecting a number of changes. Pages 362-363 discuss the issue of collaborative work, mentioning automatic maintenance of change histories.

Jensen, A-M. S., Jordan, D. S., and Russell, D. M., "The IDE System for Creating Instruction," presented to Applications of Artificial Intelligence and CD-ROM in Education and Training Conference, Arlington, Va., October 1987, describe the Instructional Design Environment (IDE) built on the NoteCards system. Section 2.2 describes Autolink buttons that are used to make link connections between cards, reducing the number of mouse clicks required for link connection; an Autolink button can be set up to automatically create links to blank cards. Section 2.3 describes templates, which are cards of a type having a predetermined format. Copending, coassigned U.S. Patent Application Ser. No. 195,230, entitled "Accelerating Link Creation," filed May 18, 1988, now U.S. Pat. No. 4,982,344 which is issued on Jan. 1, 1991 ("the Autolink application"), and incorporated herein by reference, describes Autolink buttons and templates in greater detail.

Goodman, D., "The Complete HyperCard Handbook," Bantam Books, New York, 1987, pp. 32-34, 65-67 and 185-192, describes the Recent navigation aid and linking in HyperCard. Pages 32-33 show how Recent shows miniature representations of the last forty-two unique cards viewed; the user can go to any of the represented cards by providing a mouse click on that card's representation. Page 67 points out that a link can take extra steps to eliminate manual searching on a user's part. Pages 187-188 describe hard links that take the browser from one card to another without any other kind of action and soft links performed by a HyperTalk script. The section starting at page 188 describes link creation using the Link To . . . button and the Button Info dialog box.

Garrett, L. N., Smith, K. E., and Meyrowitz, N., "Intermedia: Issues, Strategies, and Tactics in the Design of a Hypermedia Document System," *Proceedings of the Conference on Computer-Supported Cooperative Work*, Austin, Tex., Dec. 3-5, 1986, pp. 163-174, describe Intermedia, a hypermedia system for multiple users. Section 2 on pages 163-164 describes links between selections within documents, explaining how an instructor reading a report can leave comments, criticism, and suggestions for revision through annotation links, which the student who prepared the report can then see while revising the report. Section 5.4 on page 173 describes several possible ways a system could respond to a user's changes in documents, including passive notification via a facility such as electronic mail, informing users that there had been changes to documents since they last opened them.

Lewis, B. T. and Hodges J. D., "Shared Books: Collaborative Publication Management for an Office Information System,"*ACM Conference on Office Information Systems*, Mar. 23-25, 1988, pp. 197-204 describe collaborative publication management for an office information system. Page 198 states that publications have a revision history, and that it is desirable for a publication management system to be able to reproduce older revisions of a document. Pages 199-200 describes the Shared Book window, shown in FIG. 1, in which information is displayed including an entry's lock status, revision number, creation date, and notes such as status information or comments entered by a worker. A change on one workstation is not immediately broadcast to all others, but updating occurs on the next user action. The Entry Details property sheet, providing detailed information about an entry, is shown in FIG. 2 and described on page 200. Page 201 describes an automatically managed data file in the remote Shared Book that supplies the data displayed in the Shared Book window. Page 202 describes job management functions, including Notes and Reasons fields that can be used to hold both procedural and annotative information.

Kasperski, R., Chang, E., and Mellon, L., "Cantata: Group Protocols in a Conferencing Environment," *IEEE International Conference on Systems, Man, and Cybernetics*, Vol. 2, 1986, pp. 1343-1346, describes a multi-person message exchange system called Cantata. As described at pages 1343-1344, each Cantata participant has a complete history of the conversation, and a new participant entering a conversation is given a complete history of the conversation among the other participants. A participant may review by scrolling within a window.

Stefik, M., Bobrow, D. G., Foster, G. Lanning, S., and Tatar, D., "WYSIWIS Revised: Early Experiences with Multiuser Interfaces," *ACM Transactions on Office Information Systems*, Vol. 5, No. 2, April 1987, pp. 147-167, describe multiuser interface techniques including meeting tools called Boardnoter and Cognoter. Page 159 describes features of Cognoter that use reduced scale stamps to show when changes are made in corresponding full-scale windows; a bar attached along an edge of a stamp can be initially white and can become progressively darker as changes accumulate. To identify recent changes when a participant refocusses on a window, recent changes can be highlighted. Page 162 describes an overview room with miniaturized active images of rooms in which subgroups are working, with indicators showing how much change there has been and where the activity is from moment to moment. Page 163 describes a facility for highlighting recent changes in a room, making it possible to overlay privately needed annotations on information in public windows.

Leblang, D. B. and Chase, R. P., Jr., "Computer-Aided Software Engineering in a Distributed Workstation Environment," in Henderson, P., (Ed.), *Proceedings of the ACM SIGSOFT/SIGPLAN Software Engineering Symposium on Practical Software Development Environments*, Pittsburgh, Pa., Apr. 23-24, 1984, describe DSEE, a software development environment. Beginning on the second page, a section describes history management, explaining how a History Manager inquires about the reasons behind a change made by a user, then records that information, along with the date/time, node id, and person's name in the history database. The third page describes how history files are stamped with an object type unique identifier (UID).

SUMMARY OF THE INVENTION

The present invention provides techniques for automatically creating a record of operations from which the user can access a data unit on which the operations were performed. Furthermore, a record prepared according to the invention can be presented with a pointer icon that provides one-way access to the affected data unit, permitting efficient editing by a user; when editing is completed, the pointer icon can be converted to a link icon providing two-way access.

One aspect of the invention is based on the recognition of a basic problem in the preparation of a record of operations from which data affected by the operations can be accessed. In the NoteCards system, operations are typically performed by creating a data unit, called an object, that corresponds to a card or by modifying the data in a card's object. Information about the operation that was performed is necessary for preparation of a useful record, and a data processing system can obtain such information by keeping a history, such as a running log of operations performed. This history could include data indicating a card's title, the operations that created the card, the sequence of steps taken to modify its contents, and other relevant data. This history data is not enough, however, to permit access from the operations record to the affected card.

This aspect is further based on the recognition that this problem can be solved by obtaining an operations history that includes, for an operation that is performed, data indicating a unique identifier (UID) of each card affected by that operation. Each affected card's UID is included in history data describing the operation affecting it and the history data is included within the operations history. The operations history is scanned, and when the scan reaches the history data, the history data is accessed. Data corresponding to the history data is included in a history card's data unit. Data indicating the UID is associated with the history card's object, so that the affected card can be accessed from the history card.

A closely related aspect is based on the recognition that the preparation of an operations record from which affected data units can be accessed usually requires some user input. For example, in response to a user request, a history log could be scanned, with the system automatically including appropriate history data in a history card's data unit and associating UID data appropriately so that the affected cards can be accessed from the history card through link icons in the history card. Then, the user may wish to create link icons providing access from the history card to additional cards, or may wish to delete some previously created link icons. The conventional process of creating or deleting a link icon is cumbersome, however, so that it is inefficient to create a link icon and then delete it unnecessarily.

This aspect is further based on the recognition that this problem can be solved by dividing the process of providing access to an affected card into two stages. In the first stage, an icon or other selectable display feature is presented in the history card to provide one-way access to an affected card; when the icon is selected, the affected card is presented, but no linking data unit or other arrangement is set up to provide two-way access from the affected card back to the history card. In the second stage, two-way access is provided, so that a user can also access the history card from the affected card.

This solution promotes efficiency because the automatically generated contents of the history card can, in the first stage, include only icons that provide one-way access; these icons are referred to herein as "pointer icons" because, in contrast with link icons, the corresponding data units contain little besides data indicating the UID of the affected card and are not accessible from the affected card. The user can therefore edit the automatically generated contents of the history card without the costly operations of deleting link icons, which also involves deleting data in the affected card's object. When editing is completed, each pointer icon can be converted to a link icon by creating a respective linking data unit.

The following description, the drawings and the claims further set forth these and other objects, features, and advantages of the invention.

DETAILED DESCRIPTION

A. Conceptual Framework

Figure 1:
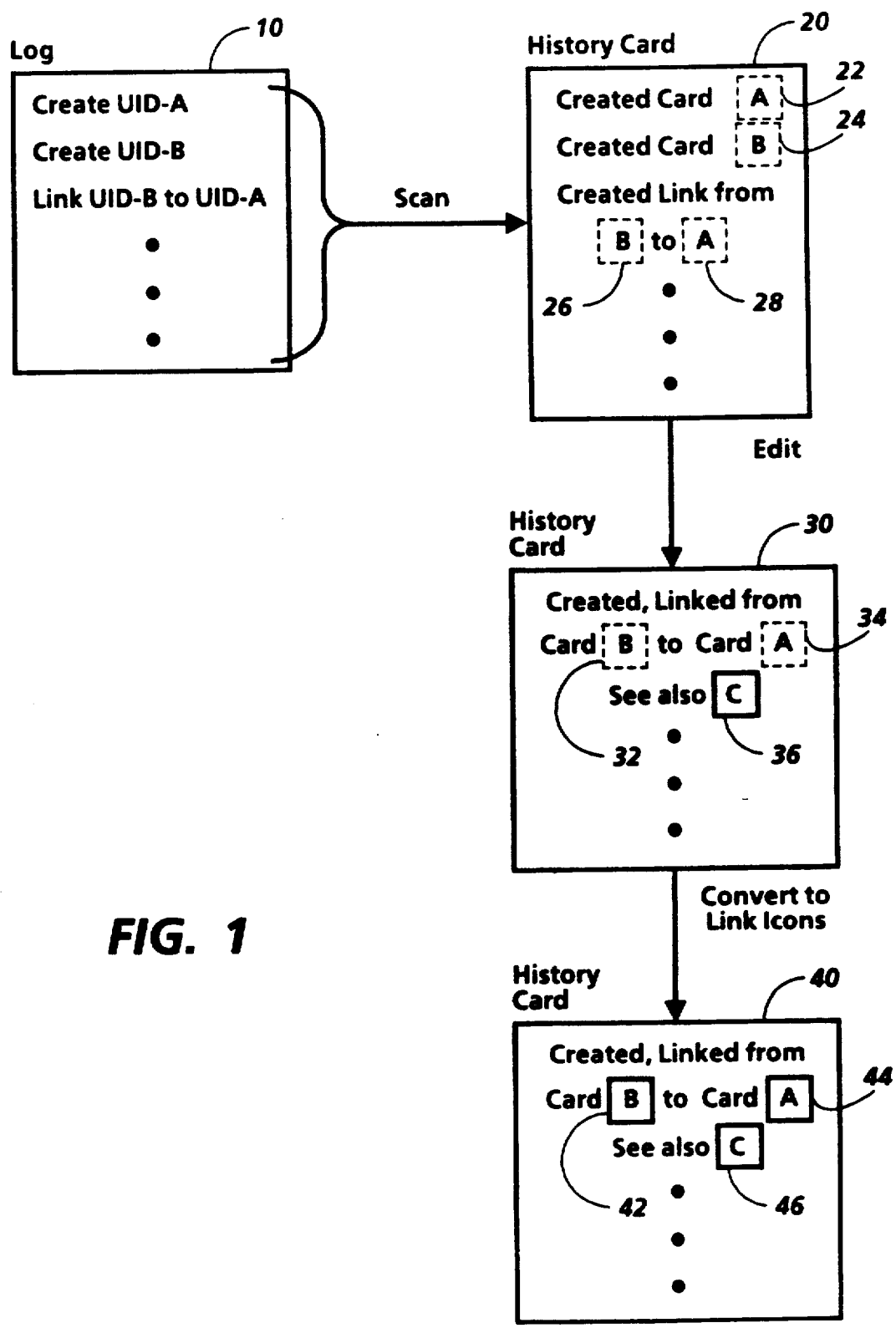
FIG. 1 is a schematic flow diagram showing steps in preparation of a record of operations according to the invention.

The following conceptual framework is helpful in understanding the broad scope of the invention, and the terms defined below have the meanings indicated throughout this application, including the claims. This conceptual framework is a modification and extension of that set forth in the following copending, coassigned U.S. patent applications, all of which are incorporated herein by reference: Ser. No. 030,766, entitled "User Interface with Multiple Workspaces for Sharing Display System Objects," filed Mar. 25, 1987, issued Dec. 10, 1991 as U.S. Pat. No. 5,072,412, Ser. No. 127,814, entitled "Small-scale Workspace Representations Indicating Activities by Other Users," filed Dec. 2, 1987, issued Nov. 27, 1990 as U.S. Pat. No. 4,974,173; Ser. No. 127,997 entitled "Multiple Shared Virtual Workspaces," filed Dec. 2, 1987, now continued as Application Ser. No. 07/570,984; Ser. No. 195,230, entitled "Accelerating Link Creation," filed May 18, 1988, issued Jan. 1, 1991 as U.S. Pat. No. 4,982,344; Ser. No. 241,525, entitled "Private Regions within a Shared Workspace," filed Sept. 7, 1988, issued Apr. 21, 1992 as U.S. Pat. No. 5,107,443, and Ser. No. 242,087, entitled "Window System with Independently Replaceable Window Functionality," filed Sept. 8, 1988, continued as Ser. No. 07/614,957, issued Jun. 9, 1992 as U.S. Pat. No. 5,121,478.

Although the invention is not limited to a digital data processing system with a display system, some of the features of the invention can be advantageously implemented using a display system, as discussed below. A wide variety of display systems for data processing systems are available including, for example, various graphical user interfaces, but, despite their diversity, these systems tend to have certain common characteristics. One fundamental common characteristic is that a display produces human perceptions. In this application, the term "display feature" refers to any human perception produced by a display.

A "workspace" is a display feature within which other display features appear to have respective relative positions. A card, as in the NoteCards system, is an example of a workspace. Another familiar example of a workspace is a window. "Presenting" a workspace that includes plural display features produces the human perception of the display features in respective positions relative to each other.

As used herein, the term "workspace" includes a "virtual workspace," defined in some of the applications incorporated herein by reference as a workspace that is not completely viewed at a given time. Presentation of a virtual workspace produces the human perception of a workspace that exists but is only partially viewed or is not always viewed. In the NoteCards system, the cards are virtual workspaces because they are not always viewed.

A "selectable unit" is a bounded display area that a user can select, such as a link icon in the NoteCards system. The term "select," when used in relation to a selectable unit, means a user input operation that includes a signal that uniquely identifies the selectable unit and requests that it be selected. The user can, for example, use a pointing device such as a mouse to select a selectable unit by indicating its position and clicking a button on the pointing device. In general, a selectable unit may take any appearance, and is not limited to a visually distinguishable feature or set of features that appears to be a coherent unity.

A selectable unit can provide "access" to a display feature, meaning that the system responds to selection of the selectable unit by presenting the display feature. A selectable unit that is presented in one workspace can, for example, provide access to another workspace that is presented when the user selects the selectable unit; in the NoteCards system, for example, a link icon in a source card provides access to a destination card. A selectable unit provides "two-way access" between two workspaces if a user viewing the accessed workspace can always access the workspace that contains the selected unit, either by selecting another selectable unit or by another form of request for access. A selectable unit provides "one-way access" between two workspaces if it provides access but does not provide "two-way access." Link icons in the NoteCards system provide two-way access, because a user viewing the destination card can always access the source card through the destination card's ShowLinks menu item. Pointer icons in the NoteCards system provide one-way access, because a user viewing the destination card cannot learn about the existence of the pointer icon and therefore cannot return to the source card.

Another common characteristic of display systems is a correspondence between data in digital memory within the data processing system and display features. In this application, a "data structure" is any combination of interrelated data. A "data unit" is a data structure that is accessible as a unit by the data processing system. In the NoteCards system, the data units corresponding to cards and links are often called "objects." Data in general can be accessed by accessing any data unit that includes the data or that is included in the data. A "unique identifier" or "UID" is a value an instance of which can be used to access a data unit; data that is an instance of a UID or that can be used to compute an instance of a UID will sometimes be referred to herein as "indicating" the UID.

A data unit is "added to" another data structure by making it accessible based on the location or contents of that other data structure. After a data unit is added to a data structure, the data structure "includes" the data unit. Two data units are "associated" with each other whenever either of them is accessible based on the location or contents of the other. For example, two data units may be associated with each other by adding one to the other, by adding both to a third data unit, or by adding a third data unit to both. Also, two data units can be associated by adding an item of data to one that can be used to access the other, such as a pointer, a handle, or other data indicating a UID. Or two data units can be associated by positioning them in adjacent locations or in locations with a known separation. In general, two data units can be associated by associating both with a third data unit in any way. Therefore, a history card data unit can be associated with an affected card's data unit through associated UID data or through a linking data unit that includes UID data.

Similarly, data in general are "added to" a data unit or other data structure by being made accessible based on the location or contents of the data unit or data structure, and thereafter the data are "included" in the data unit or data structure. Also, data in general can be "associated" by associating any of the data units included in the data or by associating any data unit that includes the data.

Data units frequently correspond to display features or to relationships between display features. A "workspace data unit" is a data unit including data relating to a respective set of one or more workspaces; for example, a card's object in the NoteCards system is a workspace data unit. A "linking data unit" or "link" is a data unit that includes data that associates workspace data units, such as data associated with a first workspace data unit that indicates the UID of a second workspace data unit; a link icon's object in the NoteCards system is a linking data unit.

"Scanning" data refers to any operation that searches through the data for some specific pattern or set of patterns.

Data is "based on" other data when the other data is used somehow in obtaining the data that is based on it.

B. General Features

Figure 2:
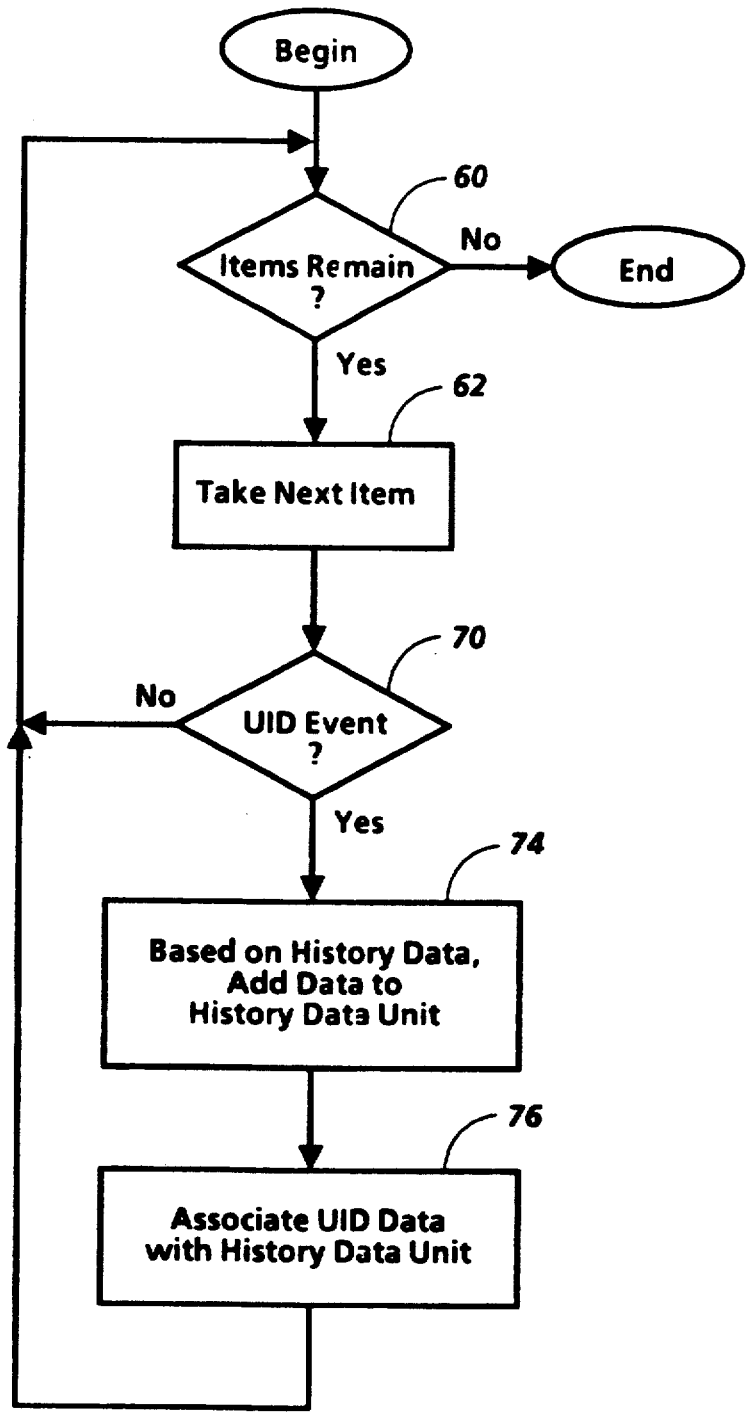
FIG. 2 is a flow chart showing general steps in scanning operations history data according to the invention.

General features of the invention can be understood from FIGS. 1-2. FIG. 1 shows the stages in preparing a record of operations, beginning with a log and progressing to a history card with link icons providing two-way access to affected cards. FIG. 2 shows the operations of a data processing system corresponding to the stages in FIG. 1.

The sequence of stages in FIG. 1 begins with log 10, a running history of operations performed on a data structure such as a NoteCards notefile, which is a hypertext database containing a set of cards and links between them. The data in log 10 is shown as a sequence of entries, each of which may result from an operation invoked by a user. Each entry includes UID data indicating the UID of each card affected by the operation. Each entry also includes data indicating the operation performed on the affected card, which could be provided in the form of a code. Log 10 includes entries showing the creation of two cards, identified by UID-A and UID-B; it also includes an entry showing the creation of a link between these two cards.

At an appropriate point, the system can scan log 10 to obtain data to be included in the data unit corresponding to history card 20. This scan could be performed continuously as the operations are performed, or it could be initiated at the user's request or automatically, either periodically or upon the occurrence of a specified event. One of the operations the system performs while scanning is to search for entries of particular types, such as entries that relate to specific types of events. Upon finding such an entry, the system accesses the data in the entry indicating the operation performed and includes data based on it in history card 20. For example, if an entry in log 10 indicates a create card operation, an entry is added to history card 20 indicating a card was created; if an entry in log 10 indicates a create link operation, an entry is added to history card 20 indicating that a link was created; and so forth for entries indicating other operations. Based on the UID data in the entry, the system also associates UID data with the history card's data unit indicating the UID of the data unit corresponding to each card affected by the operation. The UID data can be associated by being added to the history card's data unit. As discussed below, this could be done by adding a pointer icon's image object to the history card's object, providing one-way access to an affected card.

History card 20 appears in FIG. 1 somewhat as it would appear to the user. As shown, each entry in history card 20 includes at least one broken line box, each of which is a pointer icon; each pointer icon is a selectable unit providing one-way access from history card 20 to a corresponding card that was affected by an operation. Pointer icons 22 and 28 provide access to the card indicated by UID-A, while pointer icons 24 and 26 provide access to the card indicated by UID-B. Each of these pointer icons corresponds to UID data in the data unit of history card 20, and the UID data corresponding to each pointer icon indicates the UID of the corresponding card's data unit.

Therefore, when a user selects one of the pointer icons, the corresponding UID data is accessed and is in turn used to access the corresponding card's data unit, so that the corresponding card can then be presented on the display. The pointer icons thus provide one-way access to cards affected by operations.

Because history card 20 presents information that has been automatically derived from log 10, the user may desire to edit its contents. For example, the three entries in history card 20 could all be combined into a single entry and a cross-reference to another card could be added, as shown in history card 30, an edited version of history card 20. These changes could be obtained by conventional editing operations in the NoteCards system. The combined entry includes pointer icons 32 and 34, providing one-way access respectively to the card indicated by UID-B and to the card indicated by UID-A. The additional cross-reference entry includes link icon 36 which provides two-way access to the card indicated by UID-C. Link icon 36 is shown as a solid box, in contrast to the pointer icons shown as broken line boxes.

Upon completion of editing, the user can request that any or all of the pointer icons in history card 30 be converted to link icons. To make the conversion, the system responds to the user request by creating a linking data unit corresponding to each link icon and then changes the presentation of the history card to show link icons rather than pointer icons. History card 40, a subsequent version of history card 30, shows the result of converting the pointer icons 32 and 34 into link icons 42 and 44. Link icon 46 provides the same access as link icon 36 in history card 30.

FIG. 2 shows in greater detail the steps followed by the system in scanning history data such as that in log 10 in FIG. 1. The steps in FIG. 2 are not limited to a specific type of log, nor are they limited to a card-based implementation such as NoteCards; in general, they could be applied to any body of history data that includes UID data.

The sequence in FIG. 2 begins with box 60, which starts an iterative loop that handles each item in the body of data being processed. The step in box 62 takes the next item and the test in box 70 determines whether that item includes data describing one of the events being monitored, which can be an event that affects a data unit indicated by UID data in the item. If not, the sequence returns to box 60 to handle the next item in the body of data. But if the item includes data describing an event being monitored, the step in box 74 adds data based on the history data to a history data unit, such as the data unit corresponding to history card 20 in FIG. 1. Then, the step in box 76 associates UID data with the history data unit to indicate each of the affected data units, before returning to box 60 to handle the next item in the body of data; the UID data could, for example, be added in relation to a pointer icon providing one-way access, as in history card 20 in FIG. 1, or could be associated by being included in a linking data unit corresponding to a link icon providing two-way access, as in history card 40 in FIG. 1.

We turn now to consider in more detail how the features in FIGS. 1 and 2 could be implemented.

C. NoteCards Implementation

Figure 3:
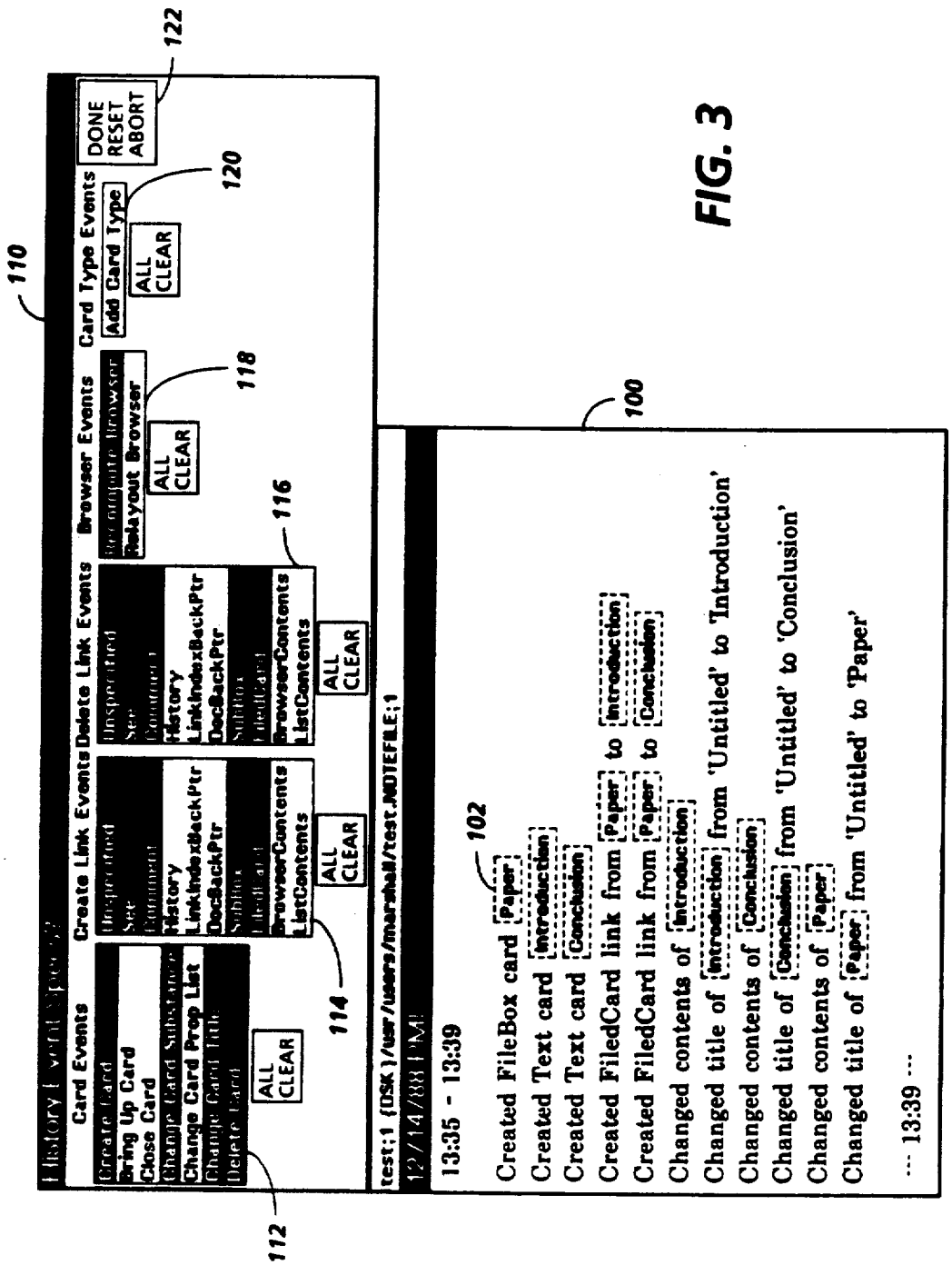
FIG. 3 is an image of a screen display showing a history card and a menu for controlling how data for the history card is obtained from a log.
Figure 4:
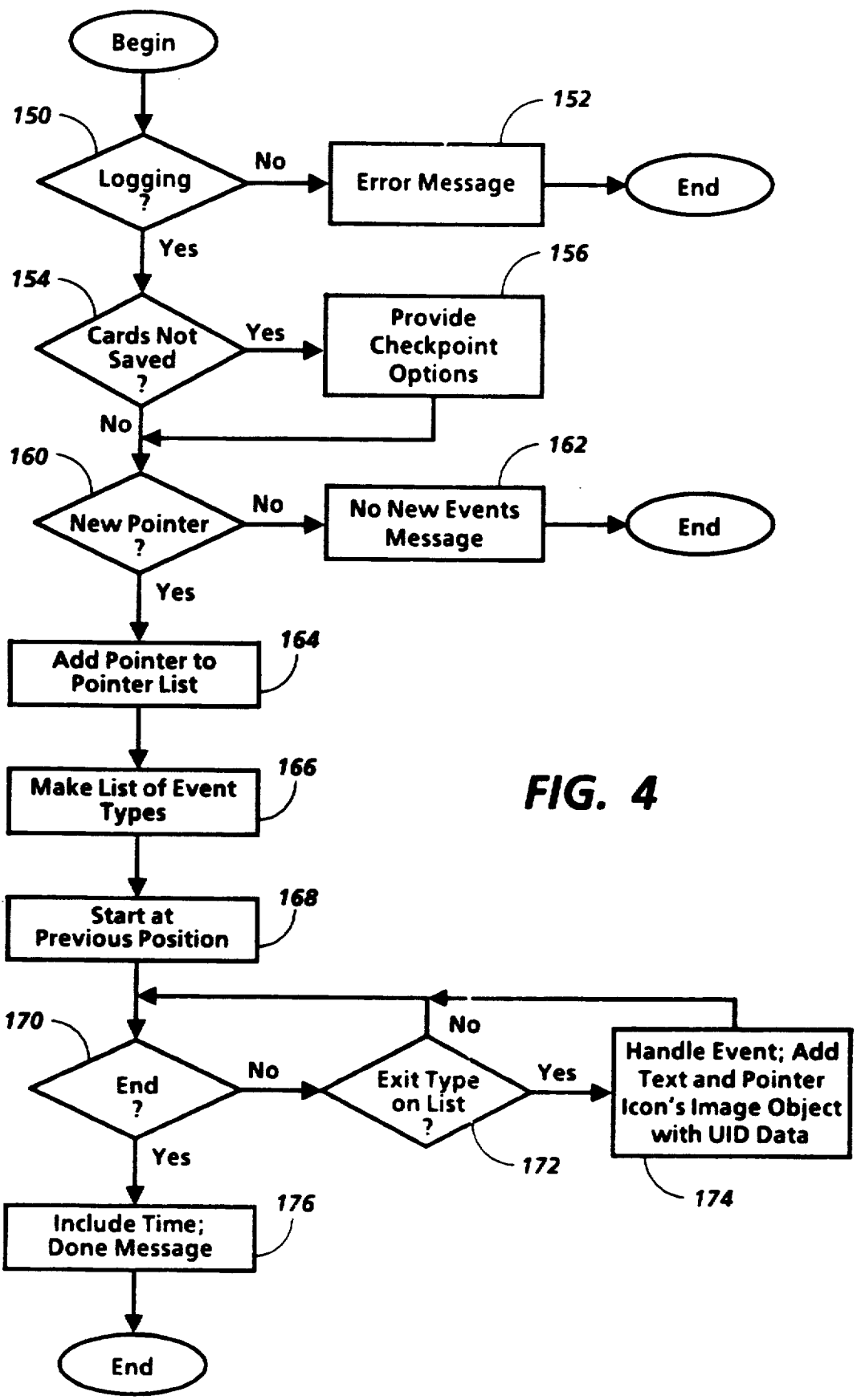
FIG. 4 is a flow chart showing steps in providing data for a history card like that in FIG. 3.
Figure 5:
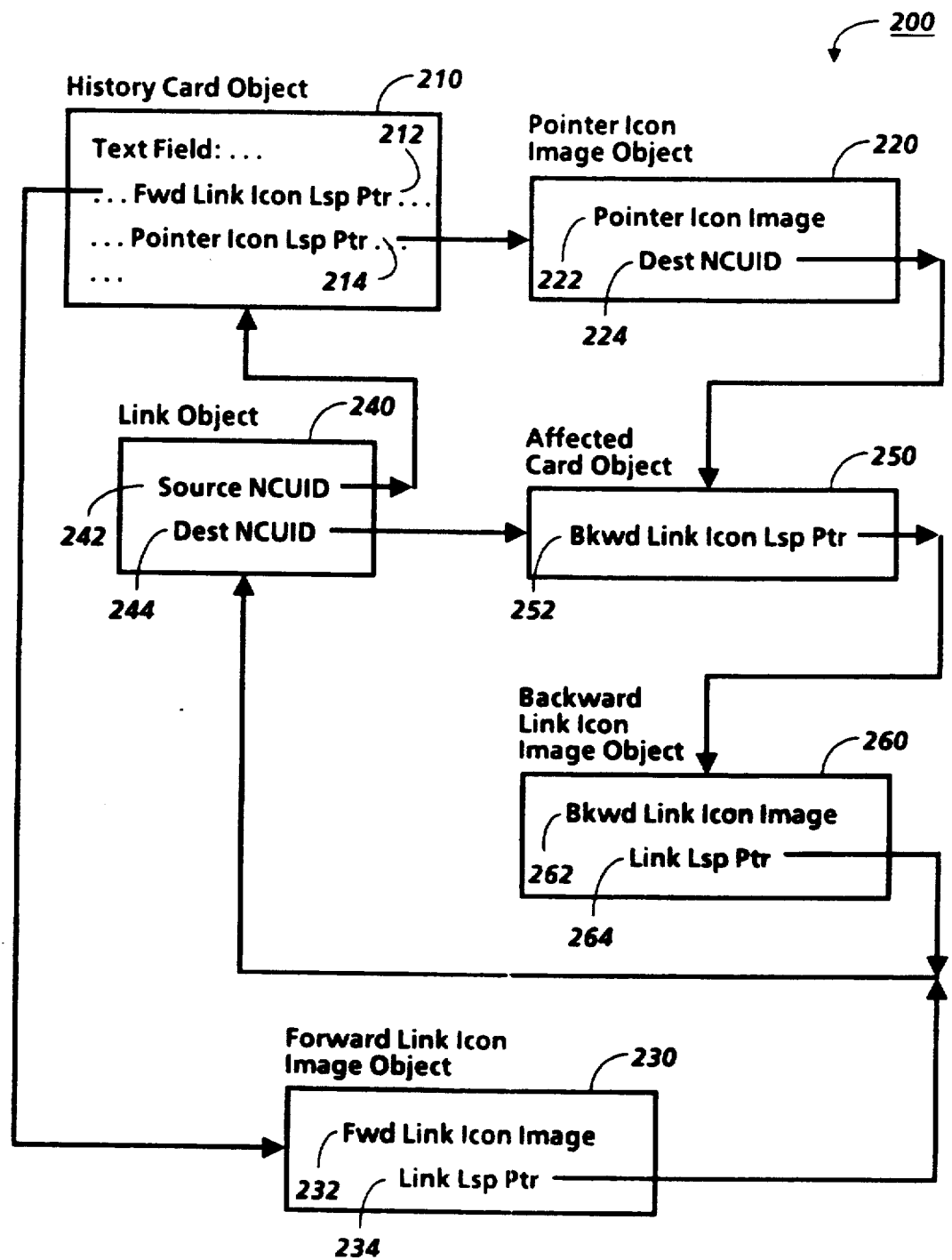
FIG. 5 is a schematic diagram showing relationships between data units according to the invention.

The invention could be implemented in a wide variety of ways. The invention has currently been implemented to run on the Lyric version of the NoteCards system, available commercially from Xerox Corporation. Appendix A is a set of NoteCards functions, written in the Lisp programming language, that creates a log of NoteCards system events. Appendix B is a set of NoteCards functions, also written in the Lisp programming language, that automatically presents history data in a history card based on the log created by the functions of Appendix A. FIG. 3 shows a portion of the user interface through which the user can control the manner in which the functions of Appendix B operate on the log. FIG. 4 shows steps in the presentation of history data by the functions of Appendix B. FIG. 5 illustrates the features of a data structure that support one-way access and two-way access from a history card to an affected card.

1. Logging

The functions of Appendix A create a log based on NoteCards system events. Some of the functions in Appendix A are housekeeping functions used to start, stop, and suspend logging; these functions include NCLOG.StartLogging, NCLOG.StopLogging, NCLOG.SuspendLogging, and a number of the other functions they call. Other functions are logging functions that are called when the NoteCards system performs an operation that is monitored, as indicated by the XCL:REINSTALL-ADVICE definations in Appendix A.

The occurrence of one of the monitored operations results in one or more calls to the function NCLOG.LogEvent. NCLOG.LogEvent in turn calls NCLOG.WriteEventToLogStream, which writes data to a file called the logging stream, including UID data provided by one of the functions NCLOG.CardObjectDEFPRINTFn, NCLOG.LinkDEFPRINTFn, NCLOG.NoteFileDEFPRINTFn, and NCLOG.UIDDEFPRINTFn. In the process, any UID that is encountered, whether the UID of a card's data unit, of a linking data unit, or of a notefile, is converted by NCLOG.NumFromUID to an integer through a hash array. NCLOG.WriteEventToLogStream also writes various associated history data such as the type of event, the time of the event, and the notefile in which it occurred.

Once the logging stream has been created in this manner, the functions in Appendix B can be called to scan it.

2. Scanning the Logging Stream

The functions in Appendix B, in addition to performing the actual scanning of the logging stream, provide a user interface through which the user can control the manner in which scanning is performed. FIG. 3 illustrates features of this user interface; FIG. 4 shows in greater detail how scanning is performed; and FIG. 5 shows a data structure supporting one-way access and two-way access from a history card to an affected card.

FIG. 3 shows an image of a display screen that includes history card 100, within which are a number of entries, each with at least one pointer icon. Pointer icon 102, for example provides one-way access to another card entitled "Paper."

The code in Appendix B includes NCHist.HistoryCardMakeFn, which is called to create and open history card 100 in response to a user request. Setting up history card 100 includes adding a number of items to the left button title menu of history card 100, including "Compute History," "Change History Event Specs," "Convert Pointers to Links," and "Start Logging." In setting up history card 100, NCHist.HistoryCardMakeFn would call NCHist.GetHistoryFileBox to create a notefile use history filebox, which a user can subsequently access to view all history cards in the notefile. Then, NCHist.HistoryCardMakeFn would create a text card, calling NCHist.CreateHistoryCardTitle to give it a title that includes the date and initials of the user. Then, it would insert the start time in the card's body. Unless a variable is set to indicate otherwise, NCHist.HistoryCardMakeFn would then call the function NCHist.StartLogging, which would in turn call NCLOG.StartLogging, discussed above, to start a log for history card 100.

FIG. 3 also illustrates a feature of the user interface that is provided when the user selects "Change History Event Specs" the user selects "Change History Event Specs" in the left button title menu of history card 100, through a call to NCHist.ChangeHistoryEventSpecs.

Style sheet menu 110 is presented annexed to the upper border of history card 100, showing categories of events the user can select to be captured during scanning. The current choices appear highlighted. Each column includes a menu of event categories of a specific type, together with a short menu with one item to select all event categories in that column ("ALL") and another item to clear the current choices in that column ("CLEAR"). The category menu of column 112 includes several categories of card events; column 114 includes categories of create link events; column 116 includes categories of delete link events; column 118 includes two categories of browser events; and column 120 includes one card type event; the user could modify the default items displayed in each of these category menus. Short menu 122 at the right allows the user to reset style sheet menu 110 or to close it, either with the newly selected categories ("DONE") or with the previous categories ("ABORT").

FIG. 4 illustrates steps taken when the user selects "Compute History" in the left button title menu of history card 100. These steps are performed as a result of a call to the function NCHist.ComputeHistory in Appendix B.

The steps in FIG. 4 begin with a test, in box 150, to determine whether logging is being performed. This will depend on whether the user has preset a value indicating no logging or has suspended logging, which the user can do through a "Suspend Logging" item on the pull-across menu of the "Start Logging" menu item; the user may not always want logging because it slows the NoteCards system. Logging can also be started or suspended for all active history cards in a notefile through a "Start Logging" item in the notefile icon's middle button menu or through a "Suspend Logging" item in its pull-across menu. If logging is not being performed, there is no history data to scan, so the step in box 152 provides an error message. But if logging is being performed, the test in box 154 determines whether any cards in the notefile have been modified but not saved; this will affect logging because some events are not logged until saved by being written in the notefile. If so, the step in box 156 presents options that the user can select, one of which performs a checkpoint operation on the notefile to save cards that have been changed but not yet saved. If the user selects a checkpoint operation, it is performed before proceeding.

The test in box 160 determines whether a pointer in the log is at a new position, indicating that events have been logged since the last time the history card was updated. This test can be performed by comparing the pointer with a list of pointer positions previously found. If not, the step in box 162 provides a message indicating no new events. But if events have been logged, the pointer position is added to the list of pointer positions previously found, in box 164.

The step in box 166 makes a list of event types to be monitored, based on user input through the user interface illustrated in FIG. 3. Then, the step in box 168 begins the scan at the most recent pointer position previous to the current pointer position or, if no pointer position had been found previously, to the start of the log. Then the scan itself begins.

The scan proceeds through an iterative loop that begins with the step in box 170, determining whether the end of the log has been reached. If not, the next item on the log is handled through a call to the function NCHist.GetLogEventFromStream, which performs the steps in boxes 172 and 174. The test in box 172 determines whether the next item on the log has an event type that is one of those on the list made in box 166. If not, the scan continues to the next item on the log, returning to box 170. But if the event type is on the list, the step in box 174 handles the event through a call to a corresponding function through the hash array set up by the function NCHist.InitializeLogEventFnHashArray. As shown in box 174, several of the functions called through the hash array add text and a pointer icon's image object to the history card. The image object includes UID data so that the pointer icon provides one-way access to a card affected by the event.

Finally, when all the items on the log have been handled, the step in box 176 can print the current time in the history card, as shown at the bottom of history card 100 in FIG. 3. The step in box 176 can also provide a message indicating that the computation of the history is done.

Once a pointer icon has been included in a history card, as in box 174 in FIG. 4, the user can convert it to a link icon, in which case a linking data unit will be created as discussed above. A single pointer icon can be converted to a link icon through a "Convert to Link" item in the middle button menu of a pointer icon. All of the pointer icons in a history card can be converted to link icons through the "Convert Pointers to Links" item in the left button title bar menu of the history card, resulting in a call to the function NCHist.ConvertPointersToLinks.

The difference between a pointer icon and a link icon in the NoteCards system and the access they provide from a history card to an affected card can be understood more fully from FIG. 5. Besides the differences illustrated in FIG. 5, a link icon is used in creating a browser but a pointer icon is not, and the titles that appear in link icons are updated automatically to the current title or to "Deleted," while those in pointer icons are updated only on redisplay.

Data structure 200 in FIG. 5 includes several data units, each of which is called an object in the NoteCards system. Most of these objects correspond to display features that can be presented during a NoteCards session. Each of the objects in FIG. 5 is shown with only a part of the data it includes, to illustrate the relevant features.

History card object 210 corresponds to a history card. One of the fields of history card object 210 is a text field, which includes a string of text. Embedded in the string of text are FwdLinkIconLspPtr 212 and PointerIconLspPtr 214, each of which is a Lisp pointer. The NoteCards system software can distinguish these Lisp pointers from other data in the string of text and can use them to access corresponding data units.

When the software follows PointerIconLspPtr 214, it accesses pointer icon image object 220. Object 220 includes pointer icon image data 222 defining how the corresponding pointer icon is presented on the display. It also includes DestNCUID 224, a NoteCards UID that can be used to obtain a Lisp pointer to a destination card's object. DestNCUID 224 is thus UID data that can be used to provide one-way access.

When the software follows FwdLinkIconLspPtr 212, it accesses forward link icon image object 230, which similarly includes forward link icon image data 232 defining how the forward link icon is presented. It also includes LinkLspPtr 234, a Lisp pointer that can be used to access a linking data unit, in this case link object 240. Link object 240 in turn includes SourceNCUID 242 and DestNCUID 244, each of which can be used to obtain a Lisp pointer, the Lisp pointers leading respectively to a source card's object and to a destination card's object. As shown, SourceNCUID 242 leads to history card object 210 because it corresponds to the card in which the forward link icon is presented. Like DestNCUID 224, DestNCUID 244 is UID data that can be used to provide access to affected card object 250, but because of SourceNCUID 242, the forward link icon can provide two-way access rather than one-way access because it is paired with a backward link icon, as described below.

Affected card object 250 could have the data to provide a card of any appropriate type. It also includes BkwdLinkIconLspPtr 252, a Lisp pointer that can be used to access backward link icon image object 260. Object 260 includes backward link icon image data 262 defining how the backward link icon is presented. In the NoteCards system, backward link icons are included in the "Show Links" menu, with each backward link icon being presented as a menu item. Object 260 also includes LinkLspPtr 264 which, like LinkLspPtr 234, leads to link object 240, completing the necessary associations to provide two-way access.

As will be understood, the objects in data structure 200 in FIG. 5 each include other fields in addition to those shown, but the fields shown illustrate differences between a pointer icon and a link icon and between one-way access and two-way access.

3. Other Features of History Cards

As noted above, each history card is automatically filed in a "NoteFile Use History" filebox, so that all history cards in the notefile can subsequently be quickly accessed. Because the history cards include icons that provide access to the cards affected by the work they represent, they can be used to access the database of cards at the affected location.

The use of history cards arose in the context of collaboration, and the "NoteFile Use History" filebox can be accessed by any of a group of collaborators to monitor one another's progress. One collaborator can learn what was done by another collaborator during a session by viewing the other collaborator's history card for that session. This use of history cards can be facilitated by setting up a history card whenever a collaborative session is begun. During the course of the session, the automatically prepared history card contents can be edited by the collaborators to include commentary, questions, and additional link icons helpful to subsequent collaborators.

D. Miscellaneous

The implementation described above could be modified in a variety of ways within the scope of the invention. For example, the invention need not be implemented for collaborators, but could be used by a single user to keep records of the user's work. Furthermore, more than one history card could be kept at the same time, each with a pointer into the same log of events. Then, when the notefile on which the user is working is closed, the log can be deleted. In addition, events other than those affecting cards could be logged, such as the NoteCards operation "Add Card Type," in which case data concerning those events could be included in a history card, if desired, even though it would be inappropriate to associate UID data with the history card based on such an event.

The implementation described above could be extended to tie events together into a coherent story. Several operations performed on a card can appear as separate, disjoint events in a history card. This could be improved by reporting a group of operations that is frequently performed together as a single history card entry, possibly in an abbreviated format. For example, the operations of creating a card, changing its title from "Untitled" to "Introduction," and adding a link icon providing access from it to filebox "Paper" could be summarized as "Created card 'Introduction' and filed it in filebox 'Paper'".

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

```
(DEFINE-FILE-INFO +PACKAGE "IL" +READTABLE "INTERLISP" +BASE 10)
(FILECREATED "14-Dec-88 14:00:56" {DSK}<LISPFILES>NOTECARDS>NCLOGGER.;2 38796 changes to%:  (FNS NCLOG.StartLogging NCLOG.StopLogging NCLOG.SuspendLogging NCLOG.LoggingOnP
                        NCLOG.FetchLogInfoList NCLOG.SetLogInfoList NCLOG.LogEvent
                        NCLOG.OpenLoggingStream NCLOG.WriteEventToLogStream NCLOG.WriteLogfileHeader
                        NCLOG.SetEventTypesToLog NCLOG.UIDFromNum NCLOG.CardObjectDEFPRINTFn
                        NCLOG.LinkDEFPRINTFn NCLOG.NotefileDEFPRINTFn NCLOG.UIDDEFPRINTFn
                        NCLOG.SingleArgDEFPRINT NCLOG.NumFromUID NCLOG.StringFromUID)

previous date%: "15-Aug-88 18:05:13" (QV)<NOTECARDS>1.3L>LIBRARY>NCLOGGER.;6)

(*
Copyright (c) 1987, 1988 by Xerox Corporation.  All rights reserved.
*)

(PRETTYCOMPRINT NCLOGGERCOMS)

(RPAQQ NCLOGGERCOMS
        ((DECLARE%: DONTCOPY (PROP MAKEFILE-ENVIRONMENT NCLOGGER))

"This package instruments NoteCards so that entries are written to a log file whenever certain monitored events take place.";

(GLOBALVARS NCLOG.GlobalLogInfo NCLOG.UIDHashArray NCLOG.HashArraySize NCLOG.UIDCtr)
        (GLOBALVARS NC.OrigReadTable NCLOG.SavedCardObject)
        (GLOBALVARS NCLOG.ListOfAllEventTypes NCLOG.ListOfEventTypes NCLOG.NumHashArray)
        (INITVARS (NCLOG.UIDCtr 0)
                (NCLOG.HashArraySize 100)
                (NCLOG.UIDHashArray (NC.CreateUIDHashArray NCLOG.HashArraySize))
                (NCLOG.GlobalLogInfo NIL))
        (INITVARS (NCLOG.NumHashArray (HASHARRAY NCLOG.HashArraySize))
                (NCLOG.ListOfAllEventTypes '(GetNewCard MakeCard.Begin MakeCard.End EditCard.Begin
                                          EditCard.End SaveCard.Begin SaveCard.End
                                          QuitCard.Begin QuitCard.End AssignTitle.Begin
                                          AssignTitle.End CacheCard UncacheCard DelCard
                                          MakeLink DelLink PutMainCardData PutLinks PutTitle
                                          PutPropList RecomputeBrowser.Begin
                                          RecomputeBrowser.End RelayoutBrowser.Begin
                                          RelayoutBrowser.End AddCardType StartLogging)))
                (NCLOG.ListOfEventTypes NCLOG.ListOfAllEventTypes))
        (RECORDS NCLogInfo)

;* ... "External interface fns ")

(FNS NCLOG.StartLogging NCLOG.StopLogging NCLOG.SuspendLogging NCLOG.LoggingOnP)

* ... "Internal stuff")

(FNS NCLOG.FetchLogInfoList NCLOG.SetLogInfoList NCLOG.LogEvent NCLOG.OpenLoggingStream
             NCLOG.WriteEventToLogStream NCLOG.WriteLogfileHeader NCLOG.SetEventTypesToLog
             NCLOG.UIDFromNum)

" Stuff to handle the printing of various NC objects ")
```

```
(FNS NCLOG.CardObjectDEFPRINTFn NCLOG.LinkDEFPRINTFn NCLOG.NoteFileDEFPRINTFn
     NCLOG.UIDDEFPRINTFn NCLOG.SingleArgDEFPRINT NCLOG.NumFromUID NCLOG.StringFromUID)

(* Here is the advice for the functions that we want to monitor *)

(*   Operations that happen to an open notefile *)

(ADVISE NC.EditNoteCard NC.QuitCard NC.MakeNoteCard NC.DeleteNoteCardInternal)
     (ADVISE NC.ActivateCard NC.DeactivateCard)
     (ADVISE NC.CardSaveFn NC.PutLinks NC.PutMainCardData NC.PutPropList NC.PutTitle)
     (ADVISE NC.AssignTitle)
     (ADVISE NC.MakeLink NC.DelToLink)
     (ADVISE NC.UpdateBrowserCard NC.RelayoutBrowserCard)
     (ADVISE NC.GetNewCard)

(*  Other operations *)

(ADVISE NC.AddCardType)))
(DECLARE%: DONTCOPY (PUTPROPS NCLOGGER MAKEFILE-ENVIRONMENT (:PACKAGE "IL" :READTABLE "INTERLISP" :BASE 10))
)

(* ;;;
"This package instruments NoteCards so that entries are written to a log file whenever certain monitored events
takeplace."
)

(DECLARE%: DOEVAL@COMPILE DONTCOPY (GLOBALVARS NCLOG.GlobalLogInfo NCLOG.UIDHashArray NCLOG.HashArraySize NCLOG.UIDCtr)
)
(DECLARE%: DOEVAL@COMPILE DONTCOPY (GLOBALVARS NC.OrigReadTable NCLOG.SavedCardObject)
)
(DECLARE%: DOEVAL@COMPILE DONTCOPY (GLOBALVARS NCLOG.ListOfAllEventTypes NCLOG.ListOfEventTypes NCLOG.NumHashArray)
)

(RPAQ? NCLOG.UIDCtr 0)

(RPAQ? NCLOG.HashArraySize 100)

(RPAQ? NCLOG.UIDHashArray (NC.CreateUIDHashArray NCLOG.HashArraySize))

(RPAQ? NCLOG.GlobalLogInfo NIL)

(RPAQ? NCLOG.NumHashArray (HASHARRAY NCLOG.HashArraySize))

(RPAQ? NCLOG.ListOfAllEventTypes '(GetNewCard MakeCard.Begin MakeCard.End EditCard.Begin
                                   EditCard.End SaveCard.Begin SaveCard.End QuitCard.Begin
                                   QuitCard.End AssignTitle.Begin AssignTitle.End CacheCard
                                   UncacheCard DelCard MakeLink DelLink PutMainCardData
                                   PutLinks PutTitle PutPropList RecomputeBrowser.Begin
                                   RecomputeBrowser.End RelayoutBrowser.Begin
                                   RelayoutBrowser.End AddCardType StartLogging))

(RPAQ? NCLOG.ListOfEventTypes NCLOG.ListOfAllEventTypes)
(DECLARE%: EVAL@COMPILE (DATATYPE NCLogInfo (LoggingStream LoggingOnFlg NoticedUIDs EventTypesToLog LoggingFileName))
)

(/DECLAREDATATYPE 'NCLogInfo '(POINTER POINTER POINTER POINTER POINTER)
     '((NCLogInfo 0 POINTER)
       (NCLogInfo 2 POINTER)
       (NCLogInfo 4 POINTER)
       (NCLogInfo 6 POINTER)
       (NCLogInfo 8 POINTER))
     '10)

(* ;;; "External interface fns.")

(DEFINEQ (NCLOG.StartLogging
  [LAMBDA (NoteFile LoggingFileNameOrNCLogInfo EventTypesToLog)

(* Turn on logging for notefile. If logging was already on then do nothing and return NIL. If LoggingFileName is NIL, then use a
   temporary file. Add current LoggingFileName to NCLogInfo record for this notefile. Accommodates multiple NCLogInfo records per notefile.
   NIL for Notefile means turn on global logging. Returns the relevant NCLogInfo record. EventTypesToLog argument determines which set of
   event types will be logged)
```

```
(DECLARE (GLOBALVARS NCLOG.ListOfEventTypes))
(LET ((NCLogInfoList (NCLOG.FetchLogInfoList NoteFile))
      NCLogInfo LoggingFileName LoggingStream)

(* ; "Sort out LoggingFileNameOrNCLogInfo")

(if (type? NCLogInfo LoggingFileNameOrNCLogInfo)
        then (SETQ NCLogInfo LoggingFileNameOrNCLogInfo)
             (SETQ LoggingFileName NIL)
      elseif LoggingFileNameOrNCLogInfo
        then (SETQ NCLogInfo NIL)
             (SETQ LoggingFileName (FULLNAME LoggingFileNameOrNCLogInfo 'NEW))
      else (SETQ LoggingFileName '(NODIRCORE)NCLOGFILE))
    (OR EventTypesToLog (SETQ EventTypesToLog NCLOG.ListOfEventTypes))

(* ; "Look for LoggingFileNameOrNCLogInfo as either a NCLogInfo record on this notefile or a filename contained in one of the
CLogInfo records.")

(if [AND NoteFile NCLogInfoList (OR (FMEMB NCLogInfo NCLogInfoList)
                                        (SETQ NCLogInfo
                                              (for NCLogInfoRecord in NCLogInfoList
                                                  thereis (EQUAL LoggingFileName
                                                                 (fetch (NCLogInfo
                                                                         LoggingFileName
                                                                        )
                                                                        of NCLogInfoRecord]
        then (if (fetch (NCLogInfo LoggingOnFlg) of NCLogInfo)
                 then (* ; "logging is already on  bail out ")

NIL
                 elseif (AND (SETQ LoggingStream (fetch (NCLogInfo LoggingStream)
                                                        of NCLogInfo))
                             (OPENP LoggingStream 'BOTH))
                     then (* ; "logging file exists and is open ")

(replace (NCLogInfo LoggingOnFlg) of NCLogInfo with
                                                                             T)
                         NCLogInfo
                 else
                     (* ;
"There's no LoggingStream or it's closed  so make one using LoggingFileName.")

(NCLOG.OpenLoggingStream NoteFile LoggingFileName LoggingStream
                                              NCLogInfo EventTypesToLog))
        else (* ; "This notefile has no logging happening.  start one up.")

(NCLOG.OpenLoggingStream NoteFile LoggingFileName NIL NIL EventTypesToLog)])

(NCLOG.StopLogging
  [LAMBDA (NoteFile NCLogInfo WriteLegendFlg)

(* ; "Turn off notefile logging.  Return the result of closing the LoggingStream.  If WriteLegendFlg is non-nil, then write down a leg
end mapping numbers to UIDs.  Write down the location of the legend at the start of the file.  Handles multiple NCLogInfo records
per notefile.  If a NCLogInfo is specified then stop logging on it.  If not stop logging on all NCLogInfo records associated with this note
file.")

(DECLARE (GLOBALVARS NC.OrigReadTable))
    (if (NCLOG.LoggingOnP NoteFile NCLogInfo)
        then (LET (NCLogInfoList LoggingStream)
                 (NCLOG.SuspendLogging NoteFile NCLogInfo)
                 [SETQ NCLogInfoList (MKLIST (OR NCLogInfo (NCLOG.FetchLogInfoList NoteFile]
                 (for NCLogInfoRecord in NCLogInfoList
                    collect (SETQ LoggingStream (fetch (NCLogInfo LoggingStream)
                                                       of NCLogInfoRecord))
                            (if (AND WriteLegendFlg LoggingStream (OPENP LoggingStream))
                                then (LET ((StartLegendLoc (GETFILEPTR LoggingStream)))
                                         (for UID in (fetch (NCLogInfo
                                                                          NoticedUIDs)
                                                            of NCLogInfoRecord)
                                            do (PRINT (LIST (NCLOG.NumFromUID UID)
                                                            UID)
                                                      LoggingStream NC.OrigReadTable))
                                         (PRINT StartLegendLoc LoggingStream NC.OrigReadTable
                                                )))
                            (PROG1 (AND LoggingStream (OPENP LoggingStream)
                                        (CLOSEF LoggingStream))
                                   (replace (NCLogInfo LoggingStream) of NCLogInfoRecord
                                      with NIL)
                                   (replace (NCLogInfo NoticedUIDs) of NCLogInfoRecord
                                      with NIL))])

(NCLOG.SuspendLogging
  [LAMBDA (NoteFile NCLogInfo)

(* ; "Temporarily turn off the logging on NoteFile but don't close LoggingStream.  Handles multiple NCLogInfo records per notefile.
If NCLogInfo is specified suspend its logging.  If not suspend logging on all NCLogInfo records associated with this notefile.  Also change
so that a NIL notefile means suspend global logging")

(DECLARE (GLOBALVARS NCLOG.GlobalLogInfo))
    (LET ((NCLogInfoList (NCLOG.FetchLogInfoList NoteFile)))
```

```
           (if NoteFile
               then (if NCLogInfo
                        then (AND (MEMBER NCLogInfo NCLogInfoList)
                                  (replace (NCLogInfo LoggingOnFlg) of NCLogInfo
                                       with NIL))
                        else (for NCLogInfoRecord in NCLogInfoList
                                 do (replace (NCLogInfo LoggingOnFlg) of
                                                                                  NCLogInfoRecord
                                         with NIL)))
               else (replace (NCLogInfo LoggingOnFlg) of NCLOG.GlobalLogInfo with NIL)])

(NCLOG.LoggingOnP
  [LAMBDA (NoteFile NCLogInfo)

(* ;; "Return non-nil if logging is turned on for NoteFile.  Handles multiple NCLogInfo records per notefile.  If no NCLogInfo is speci-
fied and there is at least one NCLogInfo record on this notefile with a non NIL LoggingOnFlg, then T is returned.  Also, now returns the Logg
ingOnFlg for NCLOG.GlobalLogInfo if notefile is NIL.")

(DECLARE (GLOBALVARS NCLOG.GlobalLogInfo))
    (LET ((NCLogInfoList (NCLOG.FetchLogInfoList NoteFile)))
         (if NoteFile
             then (if NCLogInfo
                      then (AND (MEMBER NCLogInfo NCLogInfoList)
                                (fetch (NCLogInfo LoggingOnFlg) of NCLogInfo))
                      else (for NCLogInfoRecord in NCLogInfoList
                               thereis (fetch (NCLogInfo LoggingOnFlg) of
                                                                                NCLogInfoRecord
                                         )))
             elseif (type? NCLogInfo NCLOG.GlobalLogInfo)
               then (fetch (NCLogInfo LoggingOnFlg) of NCLOG.GlobalLogInfo)
             else NIL])))

(* ;;; "Internal stuff")

(DEFINEQ (NCLOG.FetchLogInfoList
  [LAMBDA (NoteFile)

(* ;; "Fetch the NCLogInfo records from the NoteFile if any.  If NoteFile is nil, then return the global one.  Handles a list of NCLogI
nfos on each notefile.")

(DECLARE (GLOBALVARS NCLOG.GlobalLogInfo))
    (COND
      ((type? NoteFile NoteFile)
       (NCP.NoteFileProp NoteFile 'NCLogInfoList))
      ((NULL NoteFile)
       NCLOG.GlobalLogInfo)
      (T NIL])

(NCLOG.SetLogInfoList
  [LAMBDA (NoteFile NewLogInfoRecord)

(* ;; "Add this NewLogInfoRecord to the list of the NCLogInfo records for NoteFile.  If NoteFile is nil, then replace the global one.
Keeps a list of NCLogInfos on a notefile.  Resets list of NCLogInfos to NIL if NewLogInfoRecord is NIL.")

(DECLARE (GLOBALVARS NCLOG.GlobalLogInfo))
    (if (type? NoteFile NoteFile)
        then (if NewLogInfoRecord
                 then (NCP.NoteFileAddProp NoteFile 'NCLogInfoList NewLogInfoRecord)
                 else (NCP.NoteFileProp NoteFile 'NCLogInfoList NIL))
             NewLogInfoRecord
      elseif (NULL NoteFile)
        then (SETQ NCLOG.GlobalLogInfo NewLogInfoRecord)
             NewLogInfoRecord
      else NIL])

(NCLOG.LogEvent
  [LAMBDA (EventType NoteFile EventArgs)

(* ;; "Log an event of type EventType happening to NoteFile with args EventArgs.  NoteFile may be NIL if there's no notefile object.  C
an log either on global logging stream or on logging stream for given notefile or both.  Handles multiple NCLogInfo records for a notefile.")

(LET ((EventTime (IDATE))
          GlobalLogInfo NoteFileLogInfo LoggingStream)
                                                         (* ;; "Log on global logging stream if turned on.")
         (if (AND (NCLOG.LoggingOnP NIL)
                  (SETQ GlobalLogInfo (NCLOG.FetchLogInfoList NIL))
                  (SETQ LoggingStream (fetch (NCLogInfo LoggingStream) of GlobalLogInfo))
                  (OPENP LoggingStream 'OUTPUT))
             then (NCLOG.WriteEventToLogStream LoggingStream GlobalLogInfo EventType NoteFile
                         EventTime (MKLIST EventArgs))) (* ;;
                                                         "Log on local logging stream if turned on.")
         (if (type? NoteFile NoteFile)
             then (for NoteFileLogInfo in (NCLOG.FetchLogInfoList NoteFile)
                     when (AND (NCLOG.LoggingOnP NoteFile NoteFileLogInfo)
                               (SETQ LoggingStream (fetch (NCLogInfo LoggingStream)
                                                      of NoteFileLogInfo))
                               (OPENP LoggingStream 'OUTPUT)
                               (FMEMB EventType (fetch (NCLogInfo EventTypesToLog)
                                                    of NoteFileLogInfo)))
                     do (NCLOG.WriteEventToLogStream LoggingStream NoteFileLogInfo
                                EventType NoteFile EventTime (MKLIST EventArgs])
```

```
(NCLOG.OpenLoggingStream
  [LAMBDA (NoteFile LoggingFileName LoggingStream NCLogInfo EventTypesToLog)

(* ;;; "Creates a new NCLogInfo record for this notefile and logging filename.  Opens a stream to the logging file and sets the appropri
ate fields of the NCLogInfo record.  Returns the NCLogInfo record if successful.  EventTypesToLog argument determines which set of event ty
pes will be logged.")

(if NCLogInfo
        else (SETQ NCLogInfo (create NCLogInfo))
             (NCLOG.SetLogInfoList NoteFile NCLogInfo))
    (if (SETQ LoggingStream (OPENSTREAM (OR LoggingStream LoggingFileName)
                                        'BOTH))
        then (replace (NCLogInfo LoggingStream) of NCLogInfo with LoggingStream)
             (replace (NCLogInfo LoggingOnFlg) of NCLogInfo with T)
             (replace (NCLogInfo LoggingFileName) of NCLogInfo with (FULLNAME
                                                                      LoggingStream
                                                                    ))
             (replace (NCLogInfo EventTypesToLog) of NCLogInfo with EventTypesToLog)
             (NCLOG.WriteLogFileHeader LoggingStream NoteFile)
    NCLogInfo])

(NCLOG.WriteEventToLogStream
  [LAMBDA (Stream NCLogInfo EventType NoteFile EventTime EventArgs)

(* ;;; "Write given event, time, NoteFile and args to stream.  Temporarily change the UID print fn so that UIDs and other objects will g
et printed to the stream in a readable manner.")

(DECLARE (GLOBALVARS NC.OrigReadTable))
    (RESETLST
      [RESETSAVE (NCLOG.SingleArgDEFPRINT (LIST 'CardObject (FUNCTION
                                                             NCLOG.CardObjectDEFPRINTFn]
      [RESETSAVE (NCLOG.SingleArgDEFPRINT (LIST 'Link (FUNCTION NCLOG.LinkDEFPRINTFn]
      [RESETSAVE (NCLOG.SingleArgDEFPRINT (LIST 'NoteFile (FUNCTION NCLOG.NoteFileDEFPRINTFn]
      [RESETSAVE (NCLOG.SingleArgDEFPRINT (LIST 'UID (FUNCTION NCLOG.UIDDEFPRINTFn]
      (PRINT '(.EventType .EventTime .NoteFile .@EventArgs)
             Stream NC.OrigReadTable))])

(NCLOG.WriteLogFileHeader
  [LAMBDA (LoggingStream NoteFile)

(* ;;; "Write header info to the logging file for this notefile.  Currently, this is just an event having type StartLogging.")

(NCLOG.LogEvent 'StartLogging NoteFile (AND (type? NoteFile NoteFile)
                                                (fetch (NoteFile FullFileName) of
                                                  NoteFile
                                                ])

(NCLOG.SetEventTypesToLog
  [LAMBDA (NoteFile NCLogInfo EventTypesToLog)

(* ;;; "Changes the EventTypesToLog field in the NCLogInfo record of NoteFile.  If EventTypesToLog is NIL, then change the EventTypesTol
og fields of all NCLogInfo records associated with NoteFile.  If NoteFile is NIL, change the EventTypesToLog field of the global NCLogInfo re
cord.  If EventTypesToLog is NIL, then use NCLOG.ListOfEventTypes.")

(DECLARE (GLOBALVARS NCLOG.GlobalLogInfo NCLOG.ListOfEventTypes))
    (LET ((NCLogInfoList (NCLOG.FetchLogInfoList NoteFile)))
      (OR EventTypesToLog (SETQ EventTypesToLog NCLOG.ListOfEventTypes))
      (if NoteFile
          then (if NCLogInfo
                   then (for NCLogInfoRecord in NCLogInfoList
                           when (EQ NCLogInfoRecord NCLogInfo)
                           do (replace (NCLogInfo EventTypesToLog) of
                                NCLogInfo
                                with EventTypesToLog))
                   else (for NCLogInfoRecord in NCLogInfoList
                           do (replace (NCLogInfo EventTypesToLog) of NCLogInfo
                                with EventTypesToLog)))
          else (replace (NCLogInfo EventTypesToLog) of NCLOG.GlobalLogInfo with
                 EventTypesToLog)
      ])

(NCLOG.UIDFromNum
  [LAMBDA (Num)

(* ;;; "Translate an integer into a UID using a global hash array.")

(DECLARE (GLOBALVARS NCLOG.NumHashArray))
    (GETHASH Num NCLOG.NumHashArray]))

(* ;;; "Stuff to handle the printing of various NC objects.")

(DEFINEQ (NCLOG.CardObjectDEFPRINTFn
  [LAMBDA (Card Stream)

(* ;;; "This is called when PRINT, PRIN1, etc. try to print instance of Card datatype.  Only meant to be used under NCLOG.WriteEventToL
ogStream.")

(if (AND Stream (NEQ Stream 'T)
             (NOT (IMAGESTREAMP Stream)))
        then (PRINT (fetch (Card UID) of Card)
                    Stream NC.OrigReadTable)
             T
        else NIL])
```

(NCLOG.LinkDEFPRINTFn
  [LAMBDA (Link Stream)

(* .. "This is called when PRINT PRIN1 etc try to print instance of Link datatype. Only meant to be used under NCLOG writeEventToLogStream")

(if (AND Stream (NEQ Stream 'T)
            (NOT (IMAGESTREAMP Stream)))
      then (PRINT (fetch (Link UID) of Link)
                  Stream NC.OrigReadTable)
        T
      else NIL])

(NCLOG.NoteFileDEFPRINTFn
  [LAMBDA (Notefile Stream)

(* .. "This is called when PRINT PRIN1 etc try to print instance of Notefile datatype. Only meant to be used under NCLOG writeEventToLogStream")

(if (AND Stream (NEQ Stream 'T)
            (NOT (IMAGESTREAMP Stream)))
      then (PRINT (fetch (NoteFile UID) of NoteFile)
                  Stream NC.OrigReadTable)
        T
      else NIL])

(NCLOG.UIDDEFPRINTFn
  [LAMBDA (UID Stream)

(* .. "This is called when PRINT PRIN1 etc try to print instance of UID datatype. Only meant to be used under NCLOG writeEventToLogStream")

(DECLARE (GLOBALVARS NC.OrigReadTable))
    (if (AND Stream (NEQ Stream 'T)
            (NOT (IMAGESTREAMP Stream)))
      then (LET [(NCLogInfo (CAR (NLSETQ (STKARG 'NCLogInfo 'NCLOG.writeEventToLogStream]
              (if NCLogInfo
                  then (pushnew (fetch (NCLogInfo NoticedUIDs) of NCLogInfo)
                                UID)))
            (PRINT (NCLOG.NumFromUID UID)
                   Stream NC.OrigReadTable)
        T
      else NIL])

(NCLOG.SingleArgDEFPRINT
  [LAMBDA (TypeAndFn)

(* .: "This function is necessary to get around the way RESETLST works. Need this because though DEFPRINT returns the old value, it takes two args thus is unsuitable for RESETSAVE.")

(LIST (CAR TypeAndFn)
          (DEFPRINT (CAR TypeAndFn)
                    (CADR TypeAndFn)])

(NCLOG.NumFromUID
  [LAMBDA (UID)

(* :: "Translate the UID into an integer using a global hash array. This is to save space on the logging file. NCLOG.NumHashArray is used for getting UID's back from numbers later.")

(DECLARE (GLOBALVARS NCLOG.UIDHashArray NCLOG.NumHashArray NCLOG.UIDCtr))
    (if (GETHASH UID NCLOG.UIDHashArray)
      else (PUTHASH UID (add NCLOG.UIDCtr 1)
                    NCLOG.UIDHashArray)
           (PUTHASH NCLOG.UIDCtr UID NCLOG.NumHashArray])

(NCLOG.StringFromUID
  [LAMBDA (UID)

(* .. "Return an atom made from the numbers making up UID separated by commas.")

(CONCAT 'U (fetch (UID UID0) of UID)
            '%,
            (fetch (UID UID1) of UID)
            '%,
            (fetch (UID UID2) of UID)
            '%,
            (fetch (UID UID3) of UID)
            '%,
            (fetch (UID UID4) of UID)
            '%,
            (fetch (UID UID5) of UID)
            '%,
            (fetch (UID UID6) of UID)])

(* ;;; "Here's the advice for the functions that we want to monitor.")

(* ;;; "Operations that happen to an open notefile.")

```
[XCL:REINSTALL-ADVICE 'NC.EditNoteCard :BEFORE '((:LAST (NCLOG.LogEvent 'EditCard.Begin
                                                                       (fetch (Card NoteFile)
                                                                              of Card)
                                                                       Card)))
                      :AFTER
                      '((:LAST (NCLOG.LogEvent 'EditCard.End (fetch (Card NoteFile) of Card)
                               Card]

[XCL:REINSTALL-ADVICE 'NC.QuitCard :AROUND '((:LAST (LET* ((ClosingCard (NC.CoerceToCard
                                                                         CardIdentifier))
                                                           (ClosingCardNoteFile (fetch
                                                                                  (Card NoteFile)
                                                                                  of ClosingCard
                                                                                )))
                                                     (NCLOG.LogEvent 'QuitCard.Begin
                                                                     ClosingCardNoteFile (LIST
                                                                                           ClosingCard Don'tDeactivateFlg
                                                                                         ))

(NCLOG.LogEvent 'QuitCard.End
                                                                     ClosingCardNoteFile (LIST
                                                                                           ClosingCard Don'tDeactivateFlg
                                                                                         ]

[XCL:REINSTALL-ADVICE 'NC.MakeNoteCard :BEFORE '[(:LAST (NCLOG.LogEvent 'MakeCard.Begin NoteFile
                                                                       (LIST NoteCardType Title NoDisplayFlg]
                      :AFTER
                      '((:LAST (NCLOG.LogEvent 'MakeCard.End NoteFile (LIST NoteCardType Title (NC.CoerceToCard
                                                                                                 !VALUE]

[XCL:REINSTALL-ADVICE 'NC.DeleteNoteCardInternal :BEFORE '((:LAST (NCLOG.LogEvent
                                                                   'DelCard
                                                                   (fetch (Card NoteFile)
                                                                          of Card)
                                                                   (LIST Card (NC.FetchTitle Card]

(READVISE NC.EditNoteCard NC.QuitCard NC.MakeNoteCard NC.DeleteNoteCardInternal)

[XCL:REINSTALL-ADVICE 'NC.ActivateCard :BEFORE '((:LAST (NCLOG.LogEvent 'CacheCard
                                                                       (fetch (Card NoteFile)
                                                                              of Card)
                                                                       Card]

[XCL:REINSTALL-ADVICE 'NC.DeactivateCard :BEFORE '((:LAST (NCLOG.LogEvent 'UncacheCard
                                                                         (fetch (Card NoteFile)
                                                                                of Card)
                                                                         Card]

(READVISE NC.ActivateCard NC.DeactivateCard)

[XCL:REINSTALL-ADVICE 'NC.CardSaveFn :BEFORE '[(:LAST (LET ((Card (NC.CoerceToCard WindowOrID)))
                                                       (NCLOG.LogEvent 'SaveCard.Begin
                                                                       (fetch (Card NoteFile)
                                                                              of Card)
                                                                       Card]
                      :AFTER
                      '((:LAST (LET ((Card (NC.CoerceToCard WindowOrID)))
                                (NCLOG.LogEvent 'SaveCard.End (fetch (Card NoteFile) of Card)
                                                Card]

[XCL:REINSTALL-ADVICE 'NC.PutLinks :BEFORE '((:LAST (NCLOG.LogEvent 'PutLinks (fetch
                                                                               (Card NoteFile)
                                                                               of Card)
                                                                   Card]

[XCL:REINSTALL-ADVICE 'NC.PutMainCardData :BEFORE '((:LAST (NCLOG.LogEvent 'PutMainCardData
                                                                          (fetch (Card NoteFile)
                                                                                 of Card)
                                                                          Card]

[XCL:REINSTALL-ADVICE 'NC.PutPropList :BEFORE '((:LAST (NCLOG.LogEvent 'PutPropList
                                                                      (fetch (Card NoteFile) of
                                                                                              Card)
                                                                      Card]

[XCL:REINSTALL-ADVICE 'NC.PutTitle :BEFORE '((:LAST (NCLOG.LogEvent 'PutTitle (fetch
                                                                               (Card NoteFile)
                                                                               of Card)
                                                                    Card]

(READVISE NC.CardSaveFn NC.PutLinks NC.PutMainCardData NC.PutPropList NC.PutTitle)

[XCL:REINSTALL-ADVICE 'NC.AssignTitle :BEFORE '[(:LAST (LET ((Card (NC.CoerceToCard CardIdentifier)))
                                                        (NCLOG.LogEvent 'AssignTitle.Begin
                                                                        (fetch (Card NoteFile)
                                                                               of Card)
                                                                        (LIST Card (NC.FetchTitle Card]
                      :AFTER
                      '((:LAST (LET ((Card (NC.CoerceToCard CardIdentifier)))
                                (NCLOG.LogEvent 'AssignTitle.End (fetch (Card NoteFile) of Card)
                                                (LIST Card (NC.FetchTitle Card]
```

```
(READVISE NC.AssignTitle)

[XCL:REINSTALL-ADVICE 'NC.MakeLink :AFTER
    '((:LAST (LET [(NoteFile (fetch (Card NoteFile) of (OR (NC.CoerceToCard SourceCard)
                                                           (NC.CoerceToCard Window)]
        (if (type? Link 'VALUE)
            then (NCLOG.LogEvent 'MakeLink NoteFile (LIST !VALUE
                                                          (fetch
                                                            (Link SourceCard)
                                                              of !VALUE)
                                                          (fetch
                                                            (Link DestinationCard
                                                            ) of !VALUE
                                                          )
                                                          (fetch
                                                            (Link Label)
                                                              of !VALUE)
                                                          (fetch
                                                            (Link AnchorMode)
                                                              of !VALUE)
                                                          (fetch
                                                            (Link DisplayMode)
                                                              of !VALUE)))]
            else (NCLOG.LogEvent 'MakeLink NoteFile !VALUE]

[XCL:REINSTALL-ADVICE 'NC.DelToLink :BEFORE
    '((:LAST (LET [(NoteFile (fetch (Card NoteFile) of (fetch (Link SourceCard)
                                                               of Link]
        (if (type? Link Link)
            then (NCLOG.LogEvent 'DelLink NoteFile (LIST Link
                                                        (fetch (Link
                                                                  SourceCard
                                                                  )
                                                          of Link)
                                                        (fetch (Link
                                                                  DestinationCard
                                                                  )
                                                          of Link)
                                                        (fetch (Link Label)
                                                          of Link)
                                                        (fetch (Link
                                                                  AnchorMode
                                                                  )
                                                          of Link)
                                                        (fetch (Link
                                                                  DisplayMode
                                                                  )
                                                          of Link)))
            else (NCLOG.LogEvent 'DelLink NoteFile Link]

(READVISE NC.MakeLink NC.DelToLink)

[XCL:REINSTALL-ADVICE 'NC.UpdateBrowserCard :BEFORE '[(:LAST (LET ((Card (NC.CoerceToCard Window)))
                                                              (NCLOG.LogEvent
                                                                'RecomputeBrowser.Begin
                                                                (fetch (Card NoteFile)
                                                                  of Card)
                                                                Card]
    :AFTER
    '((:LAST (LET ((Card (NC.CoerceToCard Window)))
              (NCLOG.LogEvent 'RecomputeBrowser.End (fetch (Card NoteFile)
                                                     of Card)
                Card]

[XCL:REINSTALL-ADVICE 'NC.RelayoutBrowserCard :BEFORE
    '[(:LAST (LET ((Card (NC.CoerceToCard Window)))
              (NCLOG.LogEvent 'RelayoutBrowser.Begin (fetch (Card NoteFile)
                                                      of Card)
                Card]
    :AFTER
    '((:LAST (LET ((Card (NC.CoerceToCard Window)))
              (NCLOG.LogEvent 'RelayoutBrowser.End (fetch (Card NoteFile) of
                                                                           Card)
                Card]

(READVISE NC.UpdateBrowserCard NC.RelayoutBrowserCard)

[XCL:REINSTALL-ADVICE 'NC.GetNewCard :AFTER '((:LAST (NCLOG.LogEvent 'GetNewCard NoteFile
                                                          (LIST !VALUE Type]

(READVISE NC.GetNewCard)

(* ;;; "Other operations.")
```

```
[XCL REINSTALL-ADVICE 'NC.AddCardType :BEFORE ((:LAST (NCLOG.LogEvent 'AddCardType NIL TypeName]
(READVISE NC.AddCardType)
(PUTPROPS NCLOGGER COPYRIGHT ("Xerox Corporation" 1987 1988))
(DECLARE%: DONTCOPY
    (FILEMAP (NIL (5784 14257 (NCLOG.StartLogging 5794 . 9324) (NCLOG.StopLogging 9326 . 11761) (
NCLOG.SuspendLogging 11763 . 13002) (NCLOG.LoggingOnP 13004 . 14255)) (14291 22205 (
NCLOG.FetchLogInfoList 14301 . 14739) (NCLOG.SetLogInfoList 14741 . 15536) (NCLOG.LogEvent 15538 .
17491) (NCLOG.OpenLoggingStream 17493 . 18822) (NCLOG.WriteEventToLogStream 18824 . 19739) (
NCLOG.WriteLogfileHeader 19741 . 20282) (NCLOG.SetEventTypesToLog 20284 . 21998) (NCLOG.UIDFromNum
22000 . 22203)) (22276 25793 (NCLOG.CardObjectDEFPRINTFn 22286 . 22729) (NCLOG.LinkDEFPRINTFn 22731 .
23168) (NCLOG.NoteFileDEFPRINTFn 23170 . 23627) (NCLOG.UIDDEFPRINTFn 23629 . 24383) (
NCLOG.SingleArgDEFPRINT 24385 . 24726) (NCLOG.NumFromUID 24728 . 25241) (NCLOG.StringFromUID 25243 .
25791))))
STOP
```

APPENDIX B

```
(DEFINE-FILE-INFO +PACKAGE "IL" +READTABLE "INTERLISP" +BASE 10)
(FILECREATED "14-Dec-88 12:48:13" {DSK}<LISPFILES>NOTECARDS>NCHISTORYCARD.;3 60712 changes to%:  (FNS NCHist.HistoricizeNoteFile NCHist.CreateHistoryCardTitle
                        NCHist.GetHistoryFileBox NCHist.HistoryCardWhenSavedFn
                        NCHist.ShaveLeadingSpace NCHist.CreateHistoryDate
                        NCHist.NoteFileWhenOpenedFn NCHist.HistoryCardMakeFn NCHist.AddHistoryCard
                        NCHist.ComputeHistory NCHist.GetLogEventFromStream
                        NCHist.ChangeHistoryEventSpecs NCHist.AskHistoryEventSpecs
                        NCHist.InitializeHistoryEventsSpecsStylesheet
                        NCHist.InitializeHistoryEventHashArray NCHist.InitializeLogEventFnHashArray
                        NCHist.InitializeEventCategories NCHist.ConvertPointersToLinks
                        NCHist.StartLogging NCHist.SuspendLogging NCHist.StartNoteFileLogging
                        NCHist.SuspendNoteFileLogging NCHist.StartHistoryCardLogging
                        NCHist.SuspendHistoryCardLogging NCHist.CreateLinkEventsMenuItemsFn
                        NCHist.CreateLinkEventsDefaultMenuChoicesFn
                        NCHist.CreateLinkEventsMenuChoicesFn NCHist.DeleteLinkEventsMenuItemsFn
                        NCHist.DeleteLinkEventsDefaultMenuChoicesFn
                        NCHist.DeleteLinkEventsMenuChoicesFn NCHist.EditCard.EndDisplayFn
                        NCHist.QuitCard.EndDisplayFn NCHist.GetNewCardDisplayFn
                        NCHist.DelCardDisplayFn NCHist.PutMainCardDataDisplayFn
                        NCHist.PutPropListDisplayFn NCHist.PutTitleDisplayFn
                        NCHist.AssignTitle.BeginDisplayFn NCHist.MakeLinkDisplayFn
                        NCHist.DelLinkDisplayFn NCHist.RecomputeBrowser.EndDisplayFn
                        NCHist.RelayoutBrowser.EndDisplayFn NCHist.AddCardTypeDisplayFn)
                  (VARS NCHISTORYCARDCOMS)

previous date%: "26-Jul-88 14:25:20" {QV}<NOTECARDS>1.3L>LIBRARY>NCHISTORYCARD.;3)

(* "
Copyright (c) 1986, 1987, 1988 by Xerox Corporation. All rights reserved.
")

(PRETTYCOMPRINT NCHISTORYCARDCOMS)

(RPAQQ NCHISTORYCARDCOMS
    ((DECLARE%: DONTCOPY (PROP MAKEFILE-ENVIRONMENT NCHISTORYCARD))
     [DECLARE%: COPY FIRST (P (NC.LoadFileFromDirectories 'NCCOLLABORATORCARD)
                              (NC.LoadFileFromDirectories 'NCLOGGER]

(* ;;; "Package of History Card and handy functions");

(FNS NCHist.HistoricizeNoteFile NCHist.NoteFileWhenOpenedFn NCHist.CreateHistoryCardTitle
             NCHist.GetHistoryFileBox)
        (FNS NCHist.HistoryCardMakeFn NCHist.HistoryCardWhenSavedFn NCHist.AddHistoryCard)
        (FNS NCHist.ShaveLeadingSpace)

(* ;;; "General automated history card functions"), (FNS NCHist.CreateHistoryDate NCHist.ComputeHistory NCHist.GetLogEventFromStream
             NCHist.ChangeHistoryEventSpecs NCHist.AskHistoryEventSpecs
             NCHist.InitializeHistoryEventsSpecsStylesheet NCHist.InitializeHistoryEventHashArray
             NCHist.InitializeLogEventFnHashArray NCHist.InitializeEventCategories
             NCHist.ConvertPointersToLinks NCHist.StartLogging NCHist.SuspendLogging
             NCHist.StartNoteFileLogging NCHist.SuspendNoteFileLogging NCHist.StartHistoryCardLogging
             NCHist.SuspendHistoryCardLogging)

"Fns for the various event category functions"

(FNS NCHist.CreateLinkEventsMenuItemsFn NCHist.CreateLinkEventsDefaultMenuChoicesFn
             NCHist.CreateLinkEventsMenuChoicesFn NCHist.DeleteLinkEventsMenuItemsFn
             NCHist.DeleteLinkEventsDefaultMenuChoicesFn NCHist.DeleteLinkEventsMenuChoicesFn)

(* ;;; "Fns called to display the events in the History Card")

(FNS NCHist.EditCard.EndDisplayFn NCHist.QuitCard.EndDisplayFn NCHist.GetNewCardDisplayFn
             NCHist.DelCardDisplayFn NCHist.PutMainCardDataDisplayFn NCHist.PutPropListDisplayFn
             NCHist.PutTitleDisplayFn NCHist.AssignTitle.BeginDisplayFn NCHist.MakeLinkDisplayFn
```

```
                NCHist.DelLinkDisplayFn NCHist.RecomputeBrowser.EndDisplayFn
                NCHist.RelayoutBrowser.EndDisplayFn NCHist.AddCardTypeDisplayFn)
        (RECORDS EventCategory)

(* ;;; Global variables settable by the user)

(GLOBALVARS NCHist.HistoryCardPosition NCHist.InhibitInitialLogging)
        (INITVARS (NCHist.HistoryCardPosition NIL)
                (NCHist.InhibitInitialLogging NIL))

(*      Other global variables)

(GLOBALVARS NCHist.HistoryEventsSpecsStylesheet NCHist.HistoryEventHashArray
                NCHist.LogEventFnHashArray NCHist.HistoryLinkType NCHist.EventCategories
                NCHist.CardEvents NCHist.Create.inkEvents NCHist.DeleteLinkEvents NCHist.BrowserEvents
                NCHist.CardTypeEvents)
        (VARS (NCHist.HistoryLinkType 'History)
                (NCHist.HistoryEventHashArray (HASHARRAY NCLOG.HashArraySize))
                (NCHist.LogEventFnHashArray (HASHARRAY NCLOG.HashArraySize))
                (NCHist.CardEvents (create EventCategory Name _ 'Card% Events MenuItems _
                                        '(Create% Card |Bring Up Card| Close% Card
                                         |Change Card Substance| |Change Card Prop List|
                                         |Change Card Title| Delete% Card)
                                        MenuItemsFn _ NIL DefaultMenuItems _
                                        '(Create% Card |Change Card Substance| |Change Card Title|
                                         Delete% Card)
                                        DefaultMenuItemsFn _ NIL MenuChoicesFn _ NIL))
                (NCHist.CreateLinkEvents (create EventCategory Name _ '|Create Link Events| MenuItems _
                                        . NIL MenuItemsFn _ (FUNCTION
                                                                NCHist.CreateLinkEventsMenuItemsFn
                                                                )
                                        DefaultMenuItems _ NIL DefaultMenuItemsFn _
                                        (FUNCTION NCHist.CreateLinkEventsDefaultMenuChoicesFn)
                                        MenuChoicesFn _ (FUNCTION
                                                                NCHist.CreateLinkEventsMenuChoicesFn
                                                                )))
                (NCHist.DeleteLinkEvents (create EventCategory Name _ '|Delete Link Events| MenuItems _
                                        . NIL MenuItemsFn _ (FUNCTION
                                                                NCHist.DeleteLinkEventsMenuItemsFn
                                                                )
                                        DefaultMenuItems _ NIL DefaultMenuItemsFn _
                                        (FUNCTION NCHist.DeleteLinkEventsDefaultMenuChoicesFn)
                                        MenuChoicesFn _ (FUNCTION
                                                                NCHist.DeleteLinkEventsMenuChoicesFn
                                                                )))
                (NCHist.BrowserEvents (create EventCategory Name _ 'Browser% Events MenuItems _
                                        '(Recompute% Browser Relayout% Browser)
                                        MenuItemsFn _ NIL DefaultMenuItems _ '(Recompute% Browser)
                                        DefaultMenuItemsFn _ NIL MenuChoicesFn _ NIL))
                (NCHist.CardTypeEvents (create EventCategory Name _ '|Card Type Events| MenuItems _
                                        '(|Add Card Type|)
                                        MenuItemsFn _ NIL DefaultMenuItems _ NIL
                                        DefaultMenuItemsFn _ NIL MenuChoicesFn _ NIL)))
        (P (NCHist.AddHistoryCard)

(PUTPROP 'History 'WhenSavedFn (FUNCTION NCHist.HistoryCardWhenSavedFn))
                (NCHist.InitializeHistoryEventsSpecsStylesheet)
                (NCHist.InitializeHistoryEventHashArray)
                (NCHist.InitializeLogEventFnHashArray)
                (NCHist.InitializeEventCategories))))
(DECLARE%: DONTCOPY (PUTPROPS NCHISTORYCARD MAKEFILE-ENVIRONMENT (:PACKAGE "IL" :READTABLE "INTERLISP" :BASE 10))
)
(DECLARE%: COPY FIRST (NC.LoadFileFromDirectories 'NCCOLLABORATORCARD)

(NC.LoadFileFromDirectories 'NCLOGGER)
)

(* ;;; "Package of History Card and handy functions")

(DEFINEQ (NCHist.HistoricizeNoteFile
  [LAMBDA (NoteFile)

(*  Initialize given notefile for History Card use.  Make a History Use Filebox if none exists and register in the notefile.  Hang a
call to NCHist.NoteFileWhenOpenedFn in the OpenEventsCard for the notefile )

(if (NCP.OpenNoteFileP NoteFile)
        then (LET ([OpenEventSExp '(PROGN (NC.LoadFileFromDirectories 'NCHISTORYCARD)
                                        (NCHist.NoteFileWhenOpenedFn NoteFile]
                  (OpenEventsCard (NCP.GetOpenEventsCard NoteFile))
                  OpenEventsCardWasCachedFlg)

(* ;;
                "Add call to NCHist.NoteFileWhenOpenedFn to the open events card substance.")

(if (NOT (SETQ OpenEventsCardWasCachedFlg (NCP.ActiveCardP OpenEventsCard)))
                )
```

```
                then (NCP.CacheCards OpenEventsCard))
           [if (NOT (MEMBER OpenEventSExp (NCP.CardSubstance OpenEventsCard)))
                then (NCP.CardSubstance OpenEventsCard (CONS OpenEventSExp (
                                                                            NCP.CardSubstance
                                                                            OpenEventsCard
                                                                            ])

(if (NOT OpenEventsCardWasCachedFlg)
                then (NCP.CloseCards OpenEventsCard))

.*    "Run the history OpenNoteFileFn now"

(NCHist.NoteFileWhenOpenedFn NoteFile))
      else (NCP.ReportError "NCHist.HistoritizeNoteFile" (CONCAT
                                                          "Can't historitize closed notefile: "
                                                          NoteFile]))
```

(NCHist.NoteFileWhenOpenedFn
```
  [LAMBDA (NoteFile)

(* :: "Function to be called when we open a NoteFile that has been Historitized." Creates and opens a new History card for this session.")

(* :: "Places new History card at (0, 0), if NCHist.HistoryCardPosition is not set.")

(* :: "Adds NoteFile Icon middle button items for starting and suspending logging on this notefile.")

(DECLARE (GLOBALVARS NCHist.HistoryCardPosition))
    (LET (HistoryCard
          (NCHist.GetHistoryFileBox NoteFile)
          [NCP.OpenCard (SETQ HistoryCard (NCP.CreateCard 'History NoteFile NIL T))
                (OR NCHist.HistoryCardPosition (SETQ NCHist.HistoryCardPosition
                                                     (create POSITION
                                                             XCOORD _ 0
                                                             YCOORD _ 0]
          (NCP.AddNoteFileIconMiddleButtonItems NoteFile '((Start Logging NCHist.StartNoteFileLogging "Start logging for all active History cards in this notefile."
                                                             (SUBITEMS (Suspend Logging
                                                                          NCHist.SuspendNoteFileLogging "Suspend logging for all active History cards in this notefile."
                                                                            ])
```

(NCHist.CreateHistoryCardTitle
```
  [LAMBDA (Card)

(* :: "Creates title for history card consisting of date and initials.")

(CONCAT (NCHist.CreateHistoryDate)

(NCP.NoteFileProp (NCP.CardNoteFile Card)
                  'Initials])
```

(NCHist.GetHistoryFileBox
```
  [LAMBDA (NoteFile)

(* :: "Create a history filebox if there isn't one already.")

(LET ((HistoryFileBox (NCP.LookupCardByName 'HistoryFileBox NoteFile)))
         (if (NOT (NCP.ValidCardP HistoryFileBox))
             then (SETQ HistoryFileBox (NCP.CreateFileBox NoteFile "NoteFile Use History" T NIL
                                                 NIL (NCP.ContentsFileBox NoteFile)))
                  (NCP.RegisterCardByName 'HistoryFileBox HistoryFileBox))
         (NCP.AddSpecialCard HistoryFileBox)
         HistoryFileBox]))
(DEFINEQ
```

(NCHist.HistoryCardMakeFn
```
  [LAMBDA (Card Title NoDisplayFlg)

(* :: "Creates a new History Card. Turns on logging. Checks NCHist.InhibitInitialLogging before turning logging on.   Stores the NCLogInfo on the notefile.")

(DECLARE (GLOBALVARS NCHist.EventCategories NCHist.InhibitInitialLogging))
    (LET ((NoteFile (NCP.CardNoteFile Card))
          ReturnValue HistoryFileBox DateString)

(* :: "If one doesn't exist, create a Notefile use history filebox, otherwise find the old one.")

(SETQ HistoryFileBox (NCHist.GetHistoryFileBox NoteFile))

(* :: "Create a text card, then give it a title and file it.")

(SETQ ReturnValue (NCP.ApplySuperTypeFn MakeFn Card Title NoDisplayFlg))

"Cache the history filebox so that NCP.FileCards won't have to close it."
    (OR (NCP.CardCachedP HistoryFileBox)
        (NCP.CacheCards HistoryFileBox))
    (NCP.FileCards Card HistoryFileBox)
    (NCP.CardTitle Card (OR Title (NCHist.CreateHistoryCardTitle Card)))
    (NCP.NoteFileAddProp NoteFile 'HistoryCards Card)

(* :: "Put the start time in the beginning of the card's substance in bold face.")
```

```
            (SETQ DateString (CONCAT (DATE (DATEFORMAT NO.DATE NO.SECONDS))
                                    " - "))
            (NCP.CardAddText Card (CONCAT DateString (CHARACTER 13))
                             'START)
            (TEDIT.LOOKS (NCP.CardSubstance Card)
                         '(WEIGHT BOLD)
                         1
                         (NCHARS DateString))
                                                        "Turn on logging for automated History cards."
            (if NCHist.InhibitInitialLogging
                else (NCHist.StartLogging Card))
            ReturnValue])
```

(NCHist.HistoryCardWhenSavedFn
```
  [LAMBDA (HistoryCard)

(* ;; "QuitFn for the History card type. Delete old close time from the History card and insert the current close time in its place.
Only do this for 'current' history cards, i.e. ones opened during this session.")

(if (for Card in (NCP.NoteFileProp (NCP.CardNoteFile HistoryCard)
                                       'HistoryCards) when (NCP.ValidCardP Card)
             thereis (NCP.SameCardP Card HistoryCard))
        then (LET ((Stream (NCP.CardSubstance HistoryCard))
                   Time AfterDashPosition CRPosition)
                  [SETQ Time (CONCAT " " (DATE (DATEFORMAT NO.DATE NO.SECONDS]
                  (SETQ AfterDashPosition (ADD1 (TEDIT.FIND Stream "-" 1)))
                  (SETQ CRPosition (TEDIT.FIND Stream (CHARACTER 13)
                                               1))
                  (TEDIT.DELETE Stream AfterDashPosition (IDIFFERENCE CRPosition
                                                                     AfterDashPosition))
                  (NCP.CardAddText HistoryCard Time AfterDashPosition)
                  (TEDIT.LOOKS (NCP.CardSubstance HistoryCard)
                               '(WEIGHT BOLD)
                               AfterDashPosition
                               (NCHARS Time])
```

(NCHist.AddHistoryCard
```
  [LAMBDA NIL (* ;; "Add History card type to card type list")

(NCP.CreateCardType
     'History
     'Text
     '[(MakeFn .(FUNCTION NCHist.HistoryCardMakeFn]
     '((DisplayedInMenuFlg T)
       (LeftButtonMenuItems .(APPEND (NC.GetCardTypeField LeftButtonMenuItems 'Text)
                                     '((" ---------- " (FUNCTION NULL))
                                       (Compute% History (FUNCTION NCHist.ComputeHistory)
                                                         "Computes a history from the current log file.")
                                       (|Change History Event Specs| (FUNCTION
                                                                      NCHist.ChangeHistoryEventSpecs)
                                                                     "Change event specs used to compute a history.")
                                       (|Convert Pointers to Links| (FUNCTION
                                                                     NCHist.ConvertPointersToLinks)
                                                                    "Converts all pointer icons to real links.")
                                       (Start% Logging (FUNCTION NCHist.StartHistoryCardLogging)
                                                       "Start logging for this History card."
                                        (SUBITEMS (Suspend% Logging (FUNCTION
                                                                     NCHist.SuspendHistoryCardLogging
                                                                     )
                                                                    "Suspend logging for this History card."
                                                   ])))
(DEFINEQ
```

(NCHist.ShaveLeadingSpace
```
  [LAMBDA (String)

(* ;; "If first char of String is a space, then return substring consisting of the rest of String")

(if (EQ (NTHCHARCODE String 1)
            32)
        then (SUBSTRING String 2)
        else String]))

(* ;;; "General automated history card functions")

(DEFINEQ
```

(NCHist.CreateHistoryDate
  [LAMBDA (Card)

(* :: "Creates date for history card.")

(LET [(SystemDate (DATE (DATEFORMAT NO.TIME NUMBER.OF.MONTH]
        (CONCAT (NCHist.ShaveLeadingSpace (SUBSTRING SystemDate 4 5))
            "/"
            (NCHist.ShaveLeadingSpace (SUBSTRING SystemDate 1 2))
            "/"
            (NCHist.ShaveLeadingSpace (SUBSTRING SystemDate 7 8])

(NCHist.ComputeHistory
  [LAMBDA (Window)

(* :: "Computes data for History card.")

(* :: "Checks if logging is turned on for this history card before computing the history.")

(DECLARE (GLOBALVARS NCHist.HistoryEventHashArray NCHist.HistoryLinkType NC.MsgDelay))
    (PROG ((HistoryCard (NCP.CoerceToCard Window))
           NoteFile NCLogInfo ActiveCards ContentsFileBox ToBeFiledFileBox OrphansFileBox)
      (SETQ NoteFile (NCP.CardNoteFile HistoryCard))
      (SETQ NCLogInfo (NCP.CardUserDataProp HistoryCard 'NCLogInfo))
      (if (OR (NULL NCLogInfo)
              (NOT (NCLOG.LoggingOnP NoteFile NCLogInfo)))
          then (NCP.PrintMsg Window T
                 "Can't compute history - logging is not turned on for this History card."
                 )
               (NCP.ClearMsg Window T NC.MsgDelay)
               (RETURN NIL))
      (SETQ ActiveCards (NC.MapCards NoteFile [FUNCTION (LAMBDA (Card)
                                                          Card]
                                     (FUNCTION NC.ActiveCardP)))

(* :: "Warn the user about changes to unsaved cards not being logged until a checkpoint is done.")

(NCP.PrintMsg Window T "Checking for active cards...")
      (if [for ActiveCard in ActiveCards
            thereis (AND (OR (NC.CardDirtyP ActiveCard)
                             (NCP.NewCardP ActiveCard))
                         (NEQ ActiveCard (fetch (Notefile LinkLabelsCard)
                                                of NoteFile))
                         (NEQ ActiveCard (fetch (NoteFile RegistryCard) of
                                                                       NoteFile))
                         (NEQ ActiveCard (NCP.LookupCardByName 'OpenEventsCard NoteFile)
                             )
                         (NEQ (NCP.CardType ActiveCard)
                              'History)
                         [NOT (AND (EQ ActiveCard (SETQ ContentsFileBox (
                                                                         NCP.ContentsFileBox
                                                                         NoteFile)))
                                   (NOT (NCP.CardDisplayedP ContentsFileBox]
                         [NOT (AND (EQ ActiveCard (SETQ ToBeFiledFileBox (
                                                                         NCP.ToBeFiledFileBox
                                                                         NoteFile)))
                                   (NOT (NCP.CardDisplayedP ToBeFiledFileBox]
                         (NOT (AND (EQ ActiveCard (SETQ OrphansFileBox (
                                                                       NCP.OrphansFileBox
                                                                       NoteFile)))
                                   (NOT (NCP.CardDisplayedP OrphansFileBox]
          then (SELECTQ (NC.AskUserWithMenu '(Yes No Cancel)
                          (CONCAT
                            "Warning - information about cards not yet saved will not be logged."
                            (CHARACTER 13)
                            "Checkpoint before computing history?")
                          Window NIL T)
                 (Yes (NCP.CheckpointNoteFiles NoteFile))
                 (No)
                 (Cancel (RETURN NIL))
                 (RETURN NIL)))
      (RETURN (RESETLST
                [RESETSAVE '(NCLOG.SuspendLogging .NoteFile .NCLogInfo)
                           '(NCLOG.StartLogging .NoteFile .NCLogInfo]
                (LET (LoggingStream SectionEndPtr SectionPtrs HistoryEventTypes)
                  (SETQ LoggingStream (fetch (NCLogInfo LoggingStream) of NCLogInfo)
                        )
                  (SETQ SectionEndPtr (GETEOFPTR LoggingStream))
                  (SETQ SectionPtrs (NCP.CardUserDataProp HistoryCard 'SectionPtrs)) -

(* :: "Compute history for current section if it has not already been computed.")

(if (NOT (NCP.ValidLinkTypeP NCHist.HistoryLinkType NoteFile))
                      then (NCP.CreateLinkType NCHist.HistoryLinkType NoteFile))

```
            (if (FMEMB SectionEndPtr SectionPtrs)
                then (NCP.PrintMsg Window T "No new events to report.")
                     (NCP.ClearMsg Window T NC.MsgDelay)
                else (NC.PrintMsg Window T "Computing history...")
                     (if SectionPtrs
                         then (SETQ SectionStartPtr (CAR (LAST SectionPtrs)))
                         else (SETQ SectionStartPtr 0))
                     (SETQ SectionPtrs (NCONC1 SectionPtrs SectionEndPtr))
                     (NCP.CardUserDataProp HistoryCard 'SectionPtrs SectionPtrs)
                     (SETQ HistoryEventTypes)
```

(* :: "Gather up all of the events to be logged for this History card. They are stored on the History card, as separate lists for each event category.")

```
                     [for HistoryEventList in (NCP.CardUserDataProp
                                                  HistoryCard
                                                  'HistoryEventSpecs)
                        do (for HistoryEventType in HistoryEventList
                              do (SETQ HistoryEventTypes
                                     (APPEND (MKLIST (GETHASH HistoryEventType
                                                              NCHist.HistoryEventHashArray
                                                              ))
                                             HistoryEventTypes]
                     (SETFILEPTR LoggingStream SectionStartPtr)
                     (while (NOT (EOFP LoggingStream)) first (SKIPSEPRS
                                                                     LoggingStream
                                                                     )
                            finally (NCP.CardAddText HistoryCard
                                           (CONCAT (CHARACTER 13)
                                                   "---"
                                                   (DATE (DATEFORMAT NO.DATE NO.SECONDS)
                                                         )
                                                   "----"
                                                   (CHARACTER 13)
                                                   (CHARACTER 13))
                                      'END) do (NCHist.GetLogEventFromStream
                                                     LoggingStream
                                                     HistoryEventTypes HistoryCard)
                            )
                     (NC.PrintMsg Window NIL "Done.")
                     (NCP.ClearMsg Window T NC.MsgDelay))))])
```

(NCHist.GetLogEventFromStream
```
  [LAMBDA (Stream HistoryEventTypes HistoryCard)
    (LET (LogEvent EventType)
         (SKIPSEPRS Stream)
         [if (NOT (EOFP Stream))
             then (SETQ LogEvent (READ Stream))
                  (SETQ EventType (CAR LogEvent))
                  (if (FMEMB EventType HistoryEventTypes)
                      then (APPLY (GETHASH EventType NCHist.LogEventFnHashArray)
                                  (CONS HistoryCard (CDR LogEvent]
         LogEvent])
```

(NCHist.ChangeHistoryEventSpecs
```
  [LAMBDA (Window)
```

(* :: "Change the values of the various History event specs")

```
    (LET ((Card (NCP.CoerceToCard Window)))
         (NC.ProtectedCardOperation Card "History Event Specs" NIL (PROG (HistoryEventSpecs)
                                                                         (SETQ HistoryEventSpecs
                                                                               (
                                                                                NCHist.AskHistoryEventSpecs
                                                                                Window Card))
                                                                         (NCP.CardUserDataProp
                                                                               Card
                                                                               'HistoryEventSpecs
                                                                               HistoryEventSpecs)
                                                                         (NC.ClearMsg Window T])
```

(NCHist.AskHistoryEventSpecs
```
  [LAMBDA (MainWindow HistoryCard)
```

(* :: "Puts up a stylesheet asking user about events, link types, etc. over which to compute the next history. The stylesheet returns a list of n things: .")

```
    (DECLARE (GLOBALVARS NCHist.HistoryEventsSpecsStylesheet NCHist.EventCategories NC.MenuFont))
    (PROG (NoteFile OldEvents Position Choices)
          (SETQ NoteFile (NCP.CardNoteFile HistoryCard))
          (SETQ OldEvents (NCP.CardUserDataProp HistoryCard 'DefaultHistoryEventSpecs))
          (if NCHist.HistoryEventsSpecsStylesheet
              else (NCHist.InitializeHistoryEventsSpecsStylesheet))
```

```
[SETQ Position (AND (WINDOWP MainWindow)
                    (create POSITION
                            XCOORD _ (fetch (REGION LEFT) of (WINDOWPROP
                                                                    MainWindow
                                                                    'REGION))
                            YCOORD _ (fetch (REGION TOP) of (WINDOWREGION MainWindow
                                                                    )
"The stylesheet is in a global var.  we only need to provide its position, items, and selections ";
        (STYLE.PROP NCHist.HistoryEventsSpecsStylesheet 'POSITION Position)
        (STYLE.PROP NCHist.HistoryEventsSpecsStylesheet 'ITEMS
                (for EventCategory in NCHist.EventCategories
                     collect (create MENU
                                     ITEMS _ (if (fetch (EventCategory MenuItems)
                                                        of EventCategory)
                                                 else (APPLY* (fetch (EventCategory
                                                                              MenuItemsFn)
                                                                     of EventCategory)
                                                              NoteFile))
                                     MENUFONT _ NC.MenuFont)))
        [STYLE.PROP NCHist.HistoryEventsSpecsStylesheet 'SELECTIONS
                (OR OldEvents (for EventCategory in NCHist.EventCategories bind
                                                                    DefaultMenuItemsFn
                               collect (if (fetch (EventCategory DefaultMenuItems)
                                                  of EventCategory)
                                           elseif (SETQ DefaultMenuItemsFn
                                                        (fetch (EventCategory
                                                                    DefaultMenuItemsFn)
                                                               of EventCategory))
                                           then (APPLY* DefaultMenuItemsFn NoteFile]
        (if (SETQ Choices (STYLESHEET NCHist.HistoryEventsSpecsStylesheet))
            then (NCP.CardUserDataProp HistoryCard 'DefaultHistoryEventSpecs Choices)
                 (RETURN (for CategoryChoices in Choices as EventCategory in
                                                                    NCHist.EventCategories
                              bind MenuChoicesFn
                              collect (if (SETQ MenuChoicesFn (fetch (EventCategory
                                                                              MenuChoicesFn)
                                                                     of EventCategory))
                                          then (APPLY* MenuChoicesFn CategoryChoices
                                                       HistoryCard NoteFile)
                                          else CategoryChoices)))
            else (RETURN OldEvents])

(NCHist.InitializeHistoryEventsSpecsStylesheet
  [LAMBDA NIL

* ; "Build a stylesheet for the History Event Specs, using the events stored by category in the ASSOC list NCLOG.ListOfEventTypes (DECLARE (GLOBALVARS NCHist.HistoryEventsSpecsStylesheet NCHist.EventCategories NC.MenuFont))
    (LET (NumCategories)
         (SETQ NumCategories (LENGTH NCHist.EventCategories))
         (SETQ NCHist.HistoryEventsSpecsStylesheet (CREATE.STYLE 'ITEMS
                                                          (from 1 to NumCategories
                                                            collect (create MENU
                                                                            ITEMS _ T))
                                                          'SELECTIONS
                                                          (from 1 to NumCategories
                                                            collect T)
                                                          'ITEM.TITLES
                                                          (for EventCategory in
                                                                    NCHist.EventCategories
                                                            collect (fetch (EventCategory
                                                                              Name)
                                                                           of EventCategory))
                                                          'ITEM.TITLE.FONT
                                                          (FONTCOPY NC.MenuFont 'WEIGHT 'BOLD)
                                                          'NEED.NOT.FILL.IN
                                                          (from 1 to NumCategories
                                                            collect 'MULTI)
                                                          'TITLE "History Event Specs?"])

(NCHist.InitializeHistoryEventHashArray
  [LAMBDA NIL
    (DECLARE (GLOBALVARS NCHist.HistoryEventHashArray NCLOG.HashArraySize))
    (if (HARRAYP NCHist.HistoryEventHashArray)
        else (SETQ NCHist.HistoryEventHashArray (HASHARRAY NCLOG.HashArraySize)))
    (PUTHASH 'Create% Card 'GetNewCard NCHist.HistoryEventHashArray)
    (PUTHASH '|Bring Up Card| 'EditCard.End NCHist.HistoryEventHashArray)
    (PUTHASH 'Close% Card 'QuitCard.End NCHist.HistoryEventHashArray)
    (PUTHASH '|Change Card Substance| 'PutMainCardData NCHist.HistoryEventHashArray)
    (PUTHASH '|Change Card Prop List| 'PutPropList NCHist.HistoryEventHashArray)
    (PUTHASH '|Change Card Title| '(AssignTitle.Begin PutTitle)
             NCHist.HistoryEventHashArray)
    (PUTHASH 'Delete% Card 'DelCard NCHist.HistoryEventHashArray)
    (PUTHASH 'Create% Link 'MakeLink NCHist.HistoryEventHashArray)
    (PUTHASH 'Delete% Link 'DelLink NCHist.HistoryEventHashArray)
```

```
     (PUTHASH 'Recompute% Browser 'RecomputeBrowser.End NCHist.HistoryEventHashArray)
     (PUTHASH 'Relayout% Browser 'RelayoutBrowser.End NCHist.HistoryEventHashArray)
     (PUTHASH '|Add Card Type| 'AddCardType NCHist.HistoryEventHashArray)
     NCHist.HistoryEventHashArray])

(NCHist.InitializeLogEventFnHashArray
  [LAMBDA NIL
    (DECLARE (GLOBALVARS NCHist.LogEventFnHashArray NCLOG.HashArraySize))
    (if (HARRAYP NCHist.LogEventFnHashArray)
       else (SETQ NCHist.LogEventFnHashArray (HASHARRAY NCLOG.HashArraySize)))
    (PUTHASH 'GetNewCard 'NCHist.GetNewCardDisplayFn NCHist.LogEventFnHashArray)
    (PUTHASH 'EditCard.End 'NCHist.EditCard.EndDisplayFn NCHist.LogEventFnHashArray)
    (PUTHASH 'QuitCard.End 'NCHist.QuitCard.EndDisplayFn NCHist.LogEventFnHashArray)
    (PUTHASH 'PutMainCardData 'NCHist.PutMainCardDataDisplayFn NCHist.LogEventFnHashArray)
    (PUTHASH 'PutPropList 'NCHist.PutPropListDisplayFn NCHist.LogEventFnHashArray)
    (PUTHASH 'AssignTitle.Begin 'NCHist.AssignTitle.BeginDisplayFn NCHist.LogEventFnHashArray)
    (PUTHASH 'PutTitle 'NCHist.PutTitleDisplayFn NCHist.LogEventFnHashArray)
    (PUTHASH 'DelCard 'NCHist.DelCardDisplayFn NCHist.LogEventFnHashArray)
    (PUTHASH 'MakeLink 'NCHist.MakeLinkDisplayFn NCHist.LogEventFnHashArray)
    (PUTHASH 'DelLink 'NCHist.DelLinkDisplayFn NCHist.LogEventFnHashArray)
    (PUTHASH 'RecomputeBrowser.End 'NCHist.RecomputeBrowser.EndDisplayFn NCHist.LogEventFnHashArray)
    (PUTHASH 'RelayoutBrowser.End 'NCHist.RelayoutBrowser.EndDisplayFn NCHist.LogEventFnHashArray)
    (PUTHASH 'AddCardType 'NCHist.AddCardTypeDisplayFn NCHist.LogEventFnHashArray)
    NCHist.LogEventFnHashArray])

(NCHist.QuitCard.EndDisplayFn
  [LAMBDA (HistoryCard EventTime NoteFileNum CardNum Don'tDeactivateFlg)
    (DECLARE (GLOBALVARS NCHist.HistoryLinkType))
    (LET* ((NoteFile (NC.NoteFileFromNoteFileUID (NCLOG.UIDFromNum NoteFileNum)))
           (Card (NC.CardFromUID (NCLOG.UIDFromNum CardNum)
                  NoteFile)))
       (if (NEQ Card HistoryCard)
          then (NCP.CardAddText HistoryCard "Closed " 'END)
               [NC.InsertPointerInText HistoryCard Card NCHist.HistoryLinkType
                  (NCP.CoerceToLinkDisplayMode '(FLOAT FLOAT FLOAT]
               (NCP.CardAddText HistoryCard (CHARACTER 13)
                  'END]))

(NCHist.GetNewCardDisplayFn
  [LAMBDA (HistoryCard EventTime NoteFileNum CardNum CardType)
    (DECLARE (GLOBALVARS NCHist.HistoryLinkType))
    (LET* ((NoteFile (NC.NoteFileFromNoteFileUID (NCLOG.UIDFromNum NoteFileNum)))
           (Card (NC.CardFromUID (NCLOG.UIDFromNum CardNum)
                  NoteFile)))
       (if (AND Card (NEQ Card HistoryCard))
          then (NCP.CardAddText HistoryCard "Created " 'END)
               (if CardType
                  then (NCP.CardAddText HistoryCard (MKSTRING CardType)
                        'END))
               (NCP.CardAddText HistoryCard " card " 'END)
               [NC.InsertPointerInText HistoryCard Card NCHist.HistoryLinkType
                  (NCP.CoerceToLinkDisplayMode '(FLOAT FLOAT FLOAT]
               (NCP.CardAddText HistoryCard (CHARACTER 13)
                  'END]))

(NCHist.DelCardDisplayFn
  [LAMBDA (HistoryCard EventTime NoteFile Card Title)
    (if (NEQ Card HistoryCard)
       then (NCP.CardAddText HistoryCard (CONCAT "Deleted card '" Title "'" (CHARACTER 13))
             'END])

(NCHist.PutMainCardDataDisplayFn
  [LAMBDA (HistoryCard EventTime NoteFileNum CardNum)
    (DECLARE (GLOBALVARS NCHist.HistoryLinkType))
    (LET* ((NoteFile (NC.NoteFileFromNoteFileUID (NCLOG.UIDFromNum NoteFileNum)))
           (Card (NC.CardFromUID (NCLOG.UIDFromNum CardNum)
                  NoteFile)))
       (if (AND Card (NEQ Card HistoryCard)
                (NEQ Card (fetch (NoteFile LinkLabelsCard) of NoteFile))
                (NEQ Card (fetch (NoteFile RegistryCard) of NoteFile))
                (NEQ Card (NCP.LookupCardByName 'OpenEventsCard NoteFile)))
          then (NCP.CardAddText HistoryCard "Changed contents of " 'END)
               [NC.InsertPointerInText HistoryCard Card NCHist.HistoryLinkType
                  (NCP.CoerceToLinkDisplayMode '(FLOAT FLOAT FLOAT]
               (NCP.CardAddText HistoryCard (CHARACTER 13)
                  'END]))

(NCHist.PutPropListDisplayFn
  [LAMBDA (HistoryCard EventTime NoteFileNum CardNum)
    (DECLARE (GLOBALVARS NCHist.HistoryLinkType))
    (LET* ((NoteFile (NC.NoteFileFromNoteFileUID (NCLOG.UIDFromNum NoteFileNum)))
           (Card (NC.CardFromUID (NCLOG.UIDFromNum CardNum)
                  NoteFile)))
       (if (AND Card (NEQ Card HistoryCard)
                (NEQ Card (fetch (NoteFile LinkLabelsCard) of NoteFile))
                (NEQ Card (fetch (NoteFile RegistryCard) of NoteFile))
                (NEQ Card (NCP.LookupCardByName 'OpenEventsCard NoteFile))
```

```
          then (NCP.CardAddText HistoryCard "Changed property list of " 'END)
               [NC.InsertPointerInText HistoryCard Card NCHist.HistoryLinkType
```

(NCHist.StartNoteFileLogging
  [LAMBDA (NoteFile)

(* ;; "Start up logging on all active  logging History cards in this notefile.")

(DECLARE (GLOBALVARS NC.MsgDelay))
    (LET ((Window (NCP.CoerceToInterestedWindow NoteFile))
          NCLogInfo)
         (NCP.PrintMsg Window T "Starting logging...")
         (for HistoryCard in (NCP.NoteFileProp NoteFile 'HistoryCards)
            when (AND (NCP.ValidCardP HistoryCard)
                      (SETQ NCLogInfo (NCP.CardUserDataProp HistoryCard 'NCLogInfo))
                      (NOT (NCLOG.LoggingOnP NoteFile NCLogInfo))) do (NCHist.StartLogging
                                                                         HistoryCard NCLogInfo)
         )
         (NCP.PrintMsg Window NIL "done.")
         (NCP.ClearMsg Window T NC.MsgDelay])

(NCHist.SuspendNoteFileLogging
  [LAMBDA (NoteFile)

(* ;; "Suspend logging on all active. logging History cards in this notefile.")

(DECLARE (GLOBALVARS NC.MsgDelay))
    (LET ((Window (NCP.CoerceToInterestedWindow NoteFile))
          NCLogInfo)
         (NCP.PrintMsg Window T "Suspending logging...")
         (for HistoryCard in (NCP.NoteFileProp NoteFile 'HistoryCards)
            when (AND (NCP.ValidCardP HistoryCard)
                      (SETQ NCLogInfo (NCP.CardUserDataProp HistoryCard 'NCLogInfo))
                      (NCLOG.LoggingOnP NoteFile NCLogInfo)) do (NCHist.SuspendLogging
                                                                   HistoryCard NCLogInfo))
         (NCP.PrintMsg Window NIL "done.")
         (NCP.ClearMsg Window T NC.MsgDelay])

(NCHist.StartHistoryCardLogging
  [LAMBDA (Window)

(* ;; "If this history card is not currently logging, turn logging on.")

(DECLARE (GLOBALVARS NC.MsgDelay))
    (LET ((HistoryCard (NCP.CardFromWindow Window))
          NCLogInfo)
         (SETQ NCLogInfo (NCP.CardUserDataProp HistoryCard 'NCLogInfo))
         (if (NOT (NCLOG.LoggingOnP (NCP.CardNoteFile HistoryCard)
                                    NCLogInfo))
             then (NCHist.StartLogging HistoryCard NCLogInfo)
                  (NCP.PrintMsg Window T "Logging started.")
                  (NCP.ClearMsg Window T NC.MsgDelay)
             else (NCP.PrintMsg Window T "Logging already on.")
                  (NCP.ClearMsg Window T NC.MsgDelay])

(NCHist.SuspendHistoryCardLogging
  [LAMBDA (Window)

(* ;; "If this history card is currently logging, suspend logging.")

(DECLARE (GLOBALVARS NC.MsgDelay))
    (LET ((HistoryCard (NCP.CardFromWindow Window))
          NCLogInfo)
         (if (AND (SETQ NCLogInfo (NCP.CardUserDataProp HistoryCard 'NCLogInfo))
                  (NCLOG.LoggingOnP (NCP.CardNoteFile HistoryCard)
                                    NCLogInfo))
             then (NCHist.SuspendLogging HistoryCard (NCP.CardUserDataProp HistoryCard
                                                                          'NCLogInfo))
                  (NCP.PrintMsg Window T "Logging suspended.")
                  (NCP.ClearMsg Window T NC.MsgDelay)
             else (NCP.PrintMsg Window T "Logging already suspended.")
                  (NCP.ClearMsg Window T NC.MsgDelay]))

(* ;;; "Fns for the various event category functions")

(DEFINEQ

(NCHist.CreateLinkEventsMenuItemsFn
  [LAMBDA (NoteFile)
    (REVERSE (NCP.LinkTypes NoteFile]

```
(NCHist.CreateLinkEventsDefaultMenuChoicesFn
   [LAMBDA (NoteFile)
      (REMOVE 'History (APPEND (NCP.UserLinkTypes NoteFile)
                               '(FiledCard SubBox])

(NCHist.CreateLinkEventsMenuChoicesFn
   [LAMBDA (Choices HistoryCard NoteFile)
      (NCP.CardUserDataProp HistoryCard 'CreateLinkTypesToLog Choices)
      '(Create% Link])

(NCHist.DeleteLinkEventsMenuItemsFn
   [LAMBDA (NoteFile)
      (REVERSE (NCP.LinkTypes NoteFile])

(NCHist.DeleteLinkEventsDefaultMenuChoicesFn
   [LAMBDA (NoteFile)
      (REMOVE 'History (APPEND (NCP.UserLinkTypes NoteFile)
                               '(FiledCard SubBox])

(NCHist.DeleteLinkEventsMenuChoicesFn
   [LAMBDA (Choices HistoryCard NoteFile)
      (NCP.CardUserDataProp HistoryCard 'DeleteLinkTypesToLog Choices)
      '(Delete% Link]))

(* ;;; "Fns called to display the events in the History Card")

(DEFINEQ (NCHist.EditCard.EndDisplayFn
   [LAMBDA (HistoryCard EventTime NoteFileNum CardNum)
      (DECLARE (GLOBALVARS NCHist.HistoryLinkType))
      (LET* ((NoteFile (NC.NoteFileFromNoteFileUID (NCLOG.UIDFromNum NoteFileNum)))
             (Card (NC.CardFromUID (NCLOG.UIDFromNum CardNum)
                          NoteFile)))
         (if (NEQ Card HistoryCard)
             then (NCP.CardAddText HistoryCard "Brought up " 'END)
                  [NC.InsertPointerInText HistoryCard Card NCHist.HistoryLinkType
                         (NCP.CoerceToLinkDisplayMode '(FLOAT FLOAT FLOAT]
                  (NCP.CardAddText HistoryCard (CHARACTER 13)
                         'END])
                 (NCP.CoerceToLinkDisplayMode '(FLOAT FLOAT FLOAT]
         (NCP.CardAddText HistoryCard (CHARACTER 13)
                'END])

(NCHist.PutTitleDisplayFn
   [LAMBDA (HistoryCard EventTime NoteFileNum CardNum)
      (DECLARE (GLOBALVARS NCHist.HistoryLinkType))
      (LET* ((NoteFile (NC.NoteFileFromNoteFileUID (NCLOG.UIDFromNum NoteFileNum)))
             (Card (NC.CardFromUID (NCLOG.UIDFromNum CardNum)
                          NoteFile))
             OldTitle)
         (if (AND Card (NEQ Card HistoryCard)
                  (NEQ Card (fetch (NoteFile LinkLabelsCard) of NoteFile))
                  (NEQ Card (fetch (NoteFile RegistryCard) of NoteFile))
                  (NEQ Card (NCP.LookupCardByName 'OpenEventsCard NoteFile)))
             then (NCP.CardAddText HistoryCard "Changed title of " 'END)
                  [NC.InsertPointerInText HistoryCard Card NCHist.HistoryLinkType
                         (NCP.CoerceToLinkDisplayMode '(FLOAT FLOAT FLOAT]
                  (if (SETQ OldTitle (NCP.CardUserDataProp HistoryCard (MKATOM CardNum)))
                      then (NCP.CardAddText HistoryCard (CONCAT " from '" OldTitle "' to "
                                                                (NCP.CardTitle Card)
                                                                "."))
                                 'END)
                           (NCP.CardUserDataProp HistoryCard (MKATOM CardNum)
                                  NIL))
                  (NCP.CardAddText HistoryCard (CHARACTER 13)
                         'END])

(NCHist.AssignTitle.BeginDisplayFn
   [LAMBDA (HistoryCard EventTime NoteFile CardNum OldTitle)
      (if (NCP.CardUserDataProp HistoryCard (MKATOM CardNum))
          else (NCP.CardUserDataProp HistoryCard (MKATOM CardNum)
                      OldTitle])

(NCHist.MakeLinkDisplayFn
   [LAMBDA (HistoryCard EventTime NoteFileNum LinkNum SourceCardNum DestinationCardNum Label
                  AnchorMode DisplayMode)
      (DECLARE (GLOBALVARS NCHist.HistoryLinkType))
      (LET* ((NoteFile (NC.NoteFileFromNoteFileUID (NCLOG.UIDFromNum NoteFileNum)))
             (SourceCard (NC.CardFromUID (NCLOG.UIDFromNum SourceCardNum)
                                 NoteFile))
             (DestinationCard (NC.CardFromUID (NCLOG.UIDFromNum DestinationCardNum)
                                      NoteFile)))
```

```
          (if [AND (NEQ SourceCard HistoryCard)
                   (MEMBER Label (NCP.CardUserDataProp HistoryCard 'CreateLinkTypesToLog]
               then (NCP.CardAddText HistoryCard (CONCAT "Created " Label " link from ")
                          'END)
                    [NC.InsertPointerInText HistoryCard SourceCard NCHist.HistoryLinkType
                          (NCP.CoerceToLinkDisplayMode '(FLOAT FLOAT FLOAT]
                    (NCP.CardAddText HistoryCard " to " 'END)
                    [NC.InsertPointerInText HistoryCard DestinationCard NCHist.HistoryLinkType
                          (NCP.CoerceToLinkDisplayMode '(FLOAT FLOAT FLOAT]
                    (NCP.CardAddText HistoryCard (CHARACTER 13)
                          'END])

(NCHist.DelLinkDisplayFn
   [LAMBDA (HistoryCard EventTime NoteFileNum LinkNum SourceCardNum DestinationCardNum Label
                  AnchorMode DisplayMode)
     (DECLARE (GLOBALVARS NCHist.HistoryLinkType))
     (LET* ((NoteFile (NC.NoteFileFromNoteFileUID (NCLOG.UIDFromNum NoteFileNum)))
            (SourceCard (NC.CardFromUID (NCLOG.UIDFromNum SourceCardNum)
                                NoteFile))
            (DestinationCard (NC.CardFromUID (NCLOG.UIDFromNum DestinationCardNum)
                                NoteFile)))

(if [AND (NEQ SourceCard HistoryCard)
                   (MEMBER Label (NCP.CardUserDataProp HistoryCard 'DeleteLinkTypesToLog]
               then (NCP.CardAddText HistoryCard (CONCAT "Deleted " Label " link from ")
                          'END)
                    [NC.InsertPointerInText HistoryCard SourceCard NCHist.HistoryLinkType
                          (NCP.CoerceToLinkDisplayMode '(FLOAT FLOAT FLOAT]
                    (NCP.CardAddText HistoryCard " to " 'END)
                    [NC.InsertPointerInText HistoryCard DestinationCard NCHist.HistoryLinkType
                          (NCP.CoerceToLinkDisplayMode '(FLOAT FLOAT FLOAT]
                    (NCP.CardAddText HistoryCard (CHARACTER 13)
                          'END])

(NCHist.RecomputeBrowser.EndDisplayFn
   [LAMBDA (HistoryCard EventTime NoteFileNum CardNum)
     (DECLARE (GLOBALVARS NCHist.HistoryLinkType))
     (LET* ((NoteFile (NC.NoteFileFromNoteFileUID (NCLOG.UIDFromNum NoteFileNum)))
            (Card (NC.CardFromUID (NCLOG.UIDFromNum CardNum)
                         NoteFile)))
          (if (NEQ Card HistoryCard)
              then (NCP.CardAddText HistoryCard "Recomputed browser " 'END)
                   [NC.InsertPointerInText HistoryCard Card NCHist.HistoryLinkType
                          (NCP.CoerceToLinkDisplayMode '(FLOAT FLOAT FLOAT]
                   (NCP.CardAddText HistoryCard (CHARACTER 13)
                          'END])

(NCHist.RelayoutBrowser.EndDisplayFn
   [LAMBDA (HistoryCard EventTime NoteFileNum CardNum)
     (DECLARE (GLOBALVARS NCHist.HistoryLinkType))
     (LET* ((NoteFile (NC.NoteFileFromNoteFileUID (NCLOG.UIDFromNum NoteFileNum)))
            (Card (NC.CardFromUID (NCLOG.UIDFromNum CardNum)
                         NoteFile)))
          (if (NEQ Card HistoryCard)
              then (NCP.CardAddText HistoryCard "Re-laid out " 'END)
                   [NC.InsertPointerInText HistoryCard Card NCHist.HistoryLinkType
                          (NCP.CoerceToLinkDisplayMode '(FLOAT FLOAT FLOAT]
                   (NCP.CardAddText HistoryCard (CHARACTER 13)
                          'END])

(NCHist.AddCardTypeDisplayFn
   [LAMBDA (HistoryCard EventTime TypeName)
     (NCP.CardAddText HistoryCard (CONCAT "Added card type " TypeName (CHARACTER 13))
          'END])
(DECLARE%: EVAL@COMPILE (DATATYPE EventCategory (Name MenuItems MenuItemsFn DefaultMenuItems DefaultMenuItemsFn
                        MenuChoicesFn))
)

(/DECLAREDATATYPE 'EventCategory '(POINTER POINTER POINTER POINTER POINTER POINTER)
       '((EventCategory 0 POINTER)
         (EventCategory 2 POINTER)
         (EventCategory 4 POINTER)
         (EventCategory 6 POINTER)
         (EventCategory 8 POINTER)
         (EventCategory 10 POINTER))
       '12)

(* ;;; "Global variables settable by the user")

(DECLARE%: DOEVAL@COMPILE DONTCOPY (GLOBALVARS NCHist.HistoryCardPosition NCHist.InhibitInitialLogging)
```

```
)

(RPAQ? NCHist.HistoryCardPosition NIL)

(RPAQ? NCHist.InhibitInitialLogging NIL)

(* ;;; "Other global variables")

(DECLARE%: DOEVAL@COMPILE DONTCOPY (GLOBALVARS NCHist.HistoryEventsSpecsStylesheet NCHist.HistoryEventHashArray
        NCHist.LogEventFnHashArray NCHist.HistoryLinkType NCHist.EventCategories NCHist.CardEvents
        NCHist.CreateLinkEvents NCHist.DeleteLinkEvents NCHist.BrowserEvents NCHist.CardTypeEvents)
)

(RPAQQ NCHist.HistoryLinkType History)

(RPAQ NCHist.HistoryEventHashArray (HASHARRAY NCLOG.HashArraySize))

(RPAQ NCHist.LogEventFnHashArray (HASHARRAY NCLOG.HashArraySize))

(RPAQ NCHist.CardEvents
        (create EventCategory Name _ 'Card% Events MenuItems _
            '(Create% Card |Bring Up Card| Close% Card |Change Card Substance|
              |Change Card Prop List| |Change Card Title| Delete% Card)
          MenuItemsFn _ NIL DefaultMenuItems _ '(Create% Card |Change Card Substance|
                                                 |Change Card Title| Delete% Card)
          DefaultMenuItemsFn _ NIL MenuChoicesFn _ NIL))

(RPAQ NCHist.CreateLinkEvents (create EventCategory Name _ '|Create Link Events| MenuItems _ NIL
                                MenuItemsFn _ (FUNCTION NCHist.CreateLinkEventsMenuItemsFn)
                                DefaultMenuItems _ NIL DefaultMenuItemsFn _
                                (FUNCTION NCHist.CreateLinkEventsDefaultMenuChoicesFn)
                                MenuChoicesFn _ (FUNCTION
                                                 NCHist.CreateLinkEventsMenuChoicesFn)
                                ))

(RPAQ NCHist.DeleteLinkEvents (create EventCategory Name _ '|Delete Link Events| MenuItems _ NIL
                                MenuItemsFn _ (FUNCTION NCHist.DeleteLinkEventsMenuItemsFn)
                                DefaultMenuItems _ NIL DefaultMenuItemsFn _
                                (FUNCTION NCHist.DeleteLinkEventsDefaultMenuChoicesFn)
                                MenuChoicesFn _ (FUNCTION
                                                 NCHist.DeleteLinkEventsMenuChoicesFn)
                                ))

(RPAQ NCHist.BrowserEvents (create EventCategory Name _ 'Browser% Events MenuItems _
                             '(Recompute% Browser Relayout% Browser)
                             MenuItemsFn _ NIL DefaultMenuItems _ '(Recompute% Browser)
                             DefaultMenuItemsFn _ NIL MenuChoicesFn _ NIL))

(RPAQ NCHist.CardTypeEvents (create EventCategory Name _ '|Card Type Events| MenuItems _
                              '(|Add Card Type|)
                              MenuItemsFn _ NIL DefaultMenuItems _ NIL DefaultMenuItemsFn _
                              NIL MenuChoicesFn _ NIL))

(NCHist.AddHistoryCard)

(PUTPROP 'History 'WhenSavedFn (FUNCTION NCHist.HistoryCardWhenSavedFn))

(NCHist.InitializeHistoryEventsSpecsStylesheet)

(NCHist.InitializeHistoryEventHashArray)

(NCHist.InitializeLogEventFnHashArray)

(NCHist.InitializeEventCategories)
(PUTPROPS NCHISTORYCARD COPYRIGHT ("Xerox Corporation" 1986 1987 1988))
(DECLARE%: DONTCOPY
  (FILEMAP (NIL (8835 13418 (NCHist.HistoricizeNoteFile 8845 . 10902) (NCHist.NoteFileWhenOpenedFn 10904
 . 12549) (NCHist.CreateHistoryCardTitle 12551 . 12826) (NCHist.GetHistoryFileBox 12828 . 13416)) (
13419 18503 (NCHist.HistoryCardMakeFn 13429 . 15343) (NCHist.HistoryCardWhenSavedFn 15345 . 16719) (
NCHist.AddHistoryCard 16721 . 18501)) (18504 18803 (NCHist.ShaveLeadingSpace 18514 . 18801)) (18363
45113 (NCHist.CreateHistoryDate 18873 . 19297) (NCHist.ComputeHistory 19299 . 27352) (
NCHist.GetLogEventFromStream 27354 . 27875) (NCHist.ChangeHistoryEventSpecs 27877 . 28963) (
NCHist.AskHistoryEventSpecs 28970 . 33217) (NCHist.InitializeHistoryEventsSpecsStylesheet 33219 .
35259) (NCHist.InitializeHistoryEventHashArray 35261 . 36492) (NCHist.InitializeLogEventFnHashArray
36494 . 37898) (NCHist.InitializeEventCategories 37900 . 38235) (NCHist.ConvertPointersToLinks 38237
. 38705) (NCHist.StartLogging 38707 . 41409) (NCHist.SuspendLogging 41411 . 41799) (
NCHist.StartNoteFileLogging 41801 . 42653) (NCHist.SuspendNoteFileLogging 42660 . 43493) (
NCHist.StartHistoryCardLogging 43495 . 44239) (NCHist.SuspendHistoryCardLogging 44241 . 45111)) (45177
46093 (NCHist.CreateLinkEventsMenuItemsFn 45187 . 45286) (NCHist.CreateLinkEventsDefaultMenuChoicesFn
45288 . 45464) (NCHist.CreateLinkEventsMenuChoicesFn 45466 . 45638) (
NCHist.DeleteLinkEventsMenuItemsFn 45640 . 45739) (NCHist.DeleteLinkEventsDefaultMenuChoicesFn 45741
. 45917) (NCHist.DeleteLinkEventsMenuChoicesFn 45919 . 46091)) (46165 56700 (
```

```
NCHist.EditCard.EndDisplayFn 46175 . 46866) (NCHist.QuitCard.EndDisplayFn 46368 . 47574) (
NCHist.GetNewCardDisplayFn 47576 . 48512) (NCHist.DelCardDisplayFn 48514 . 48759) (
NCHist.PutMainCardDataDisplayFn 48761 . 49731) (NCHist.PutPropListDisplayFn 49733 . 50704) (
NCHist.PutTitleDisplayFn 50706 . 52214) (NCHist.AssignTitle.BeginDisplayFn 52216 . 52477) (
NCHist.MakeLinkDisplayFn 52479 . 53793) (NCHist.DelLinkDisplayFn 53795 . 55108) (
NCHist.RecomputeBrowser.EndDisplayFn 55110 . 55317) (NCHist.RelayoutBrowser.EndDisplayFn 55319 . 56513
) (NCHist.AddCardTypeDisplayFn 56520 . 56698))))
STOP
```

What is claimed is:

1. A method of operating a digital data processing system that includes digital memory, a database stored in the digital memory, and a display; the database including workspace data units; each workspace data unit having a respective unique identifier; the system being capable of presenting on the display, for each of the workspace data units, a respective workspace that includes information based on the workspace data unit; the method comprising:

performing a sequence of operations on a plurality of the workspace data units, the plurality of workspace data units including a first workspace data unit, one of the sequence of operations being performed on the first workspace data unit;

logging the sequence of operations performed on the workspace data units to produce operations history data; the operations history data including first unit history data indicating the operation performed on the first workspace data unit; the first unit history data including first UID data indicating the first workspace data unit's unique identifier;

creating a record of operations in a second one of the workspace data units in the database; the act of creating the record comprising:

scanning the operations history data until the first unit history data is reached; and based on the first unit history data, automatically including second unit history data in the second workspace data unit and automatically adding second UID data indicating the respective unique identifier of the first workspace data unit to the second workspace data unit; the second unit history data indicating the operation performed on the first workspace data unit; and displaying a second unit workspace based on the second workspace data unit; the second unit workspace including:

operation information describing the operation performed on the first workspace data unit; and a first selectable unit that a user can select to access the first workspace data unit.

2. The method of claim 1, further comprising, upon receiving a signal from a user selecting the first selectable unit, beginning to display a second selectable unit providing two-way access between the second unit workspace and a first unit workspace based on the first workspace data unit.

3. The method of claim 1, further comprising, upon receiving a signal from a user selecting the first selectable unit, adding a linking data unit to the database, the linking data unit including third UID data indicating the unique identifiers of the first and second workspace data units.

4. The method of claim 1, further comprising, upon receiving a signal from a user selecting the first selectable unit, beginning to display a first unit workspace based on the first workspace data unit.

5. The method of claim 1 in which the first selectable unit is a link icon.

6. The method of claim 1 in which the first selectable unit is a pointer icon.

7. The method of claim 1 in which the database is a hypermedia database.

* * * * *

UNITED STATES PATENT AND TRADEMARK OFFICE
CERTIFICATE OF CORRECTION

PATENT NO. : 5,159,669

DATED : October 27, 1992

INVENTOR(S) : Randall H. Trigg, Peggy M. Irish, and Lucy A. Suchman

It is certified that error appears in the above-indentified patent and that said Letters Patent is hereby corrected as shown below:

On the title page : Item [54] Title:
and in Column 1, line 3, "UNIT" should be changed to --UNIQUE-- so that the title reads: AUTOMATICALLY CREATING A SECOND WORKSPACE OPERATION RECORD INCLUDING HISTORY DATA AND A UNIQUE ID BASED ON A FIRST WORKSPACE OPERATION Signed and Sealed this Twenty-eighth Day of December, 1993

Attest:

BRUCE LEHMAN

Attesting Officer     Commissioner of Patents and Trademarks